United States Patent
Ueda et al.

(10) Patent No.: US 11,012,625 B2
(45) Date of Patent: May 18, 2021

(54) ELECTRONIC EQUIPMENT HAVING A TOUCH OPERATING FACE

(71) Applicant: CANON KABUSHIKI KAISHA, Tokyo (JP)

(72) Inventors: Haruhisa Ueda, Tokyo (JP); Jun Kamiya, Kawasaki (JP); Takahiro Akimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/455,113

(22) Filed: Jun. 27, 2019

(65) Prior Publication Data

US 2020/0007786 A1 Jan. 2, 2020

(30) Foreign Application Priority Data

Jun. 29, 2018 (JP) .............................. JP2018-125514

(51) Int. Cl.
*H04N 5/232* (2006.01)
*G06F 3/0485* (2013.01)

(52) U.S. Cl.
CPC ..... *H04N 5/232933* (2018.08); *G06F 3/0485* (2013.01)

(58) Field of Classification Search
CPC ......... H04N 5/232933; H04N 5/23209; H04N 5/23245; H04N 5/2252; H04N 5/23216; G06F 3/0485
See application file for complete search history.

(56) References Cited

U.S. PATENT DOCUMENTS

| | | | |
|---|---|---|---|
| 2016/0309076 A1* | 10/2016 | Steinberg | G06F 3/0482 |
| 2018/0234630 A1* | 8/2018 | Kondo | H04N 5/232933 |
| 2020/0068137 A1* | 2/2020 | von Fintel | H04N 5/2252 |

FOREIGN PATENT DOCUMENTS

| | | |
|---|---|---|
| CN | 103780807 A | 5/2014 |
| CN | 106217349 A | 12/2016 |
| JP | 11-345076 A | 12/1999 |
| JP | 2008-236765 A | 10/2008 |
| JP | 2012-10061 A | 1/2012 |

* cited by examiner

*Primary Examiner* — Padma Haliyur
(74) *Attorney, Agent, or Firm* — Canon U.S.A., Inc. I.P. Division

(57) ABSTRACT

Electronic equipment includes a first operating member having a touch detecting face, a first display unit provided on a first face where the touch operating face is disposed, a second display unit configured with a larger display area than the first display unit and disposed in a direction orthogonal to a horizontal direction with regard to the touch operating face, and a grip portion configured for a user to grip. The first operating member detects a touch operation and slide operation on a touch operating face. The first operating member is disposed between the first display unit and the grip portion in the horizontal direction.

19 Claims, 18 Drawing Sheets

SLIDING DIRECTION

COURSE OF ROTATION BY THUMB

SLIDING DIRECTION

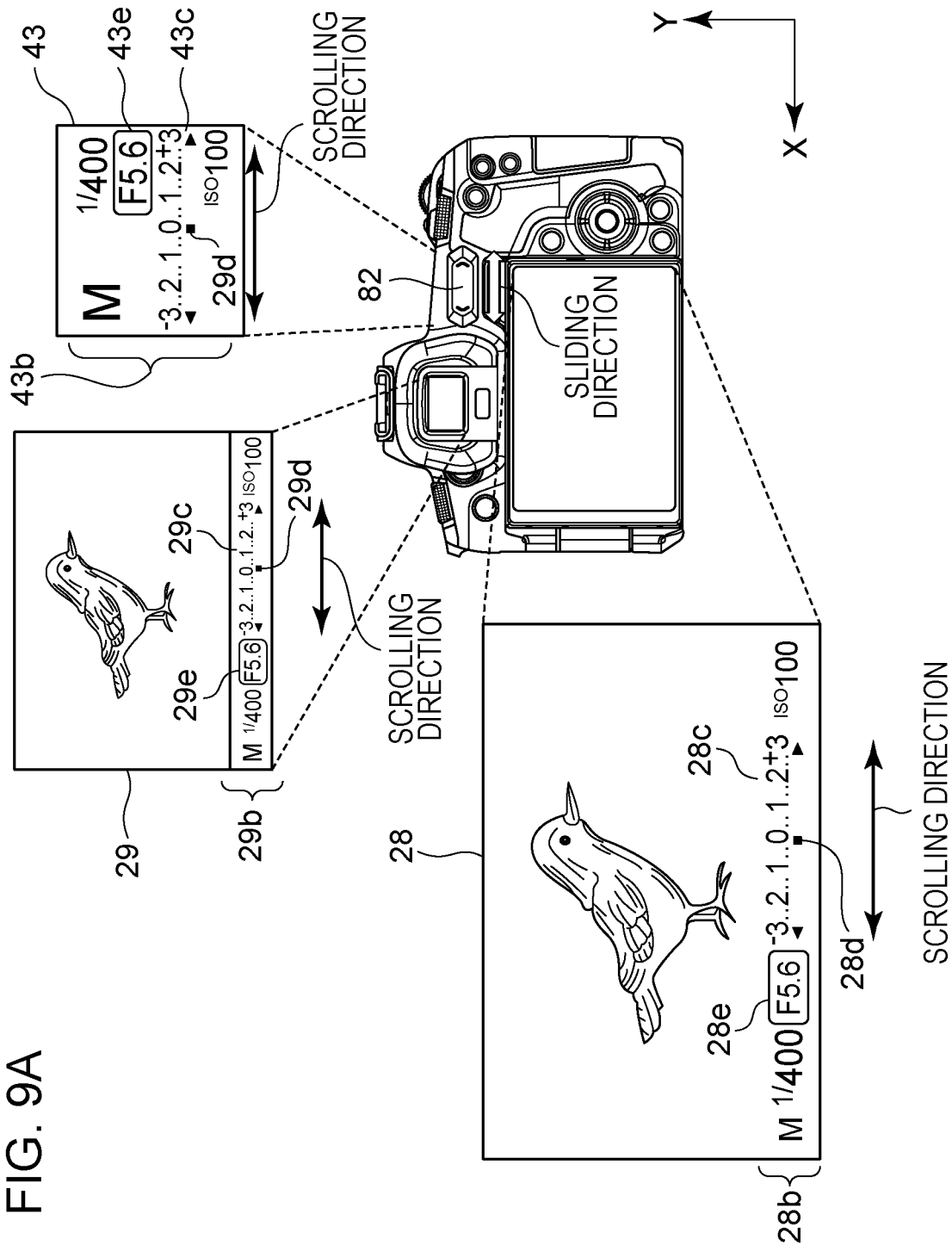

ELECTRONIC EQUIPMENT HAVING A TOUCH OPERATING FACE

BACKGROUND

Field

The present disclosure relates to electronic equipment, and more particularly relates to a layout configuration of an operating arrangement having a touch operating face that is operated by touching.

Description of the Related Art

Conventionally, imaging apparatuses have been provided with operating members for selecting setting items, such as directional pads, dials, and so forth. In recent years, there has been an increase in products that have a touch panel as a display device, and users can select/set items simply by touching displayed setting items. There are also products that have a touch sensor as an operating member, which is anticipated to serve as a user interface for shooting moving images with imaging apparatuses.

Performing settings while shooting moving images using conventional mechanical operating members results as operation sounds being recorded as noise, but operating sounds being recorded can be reduced by operating members using touch sensors.

There are various types of touch panels and touch sensors, such as capacitive, resistive, optical, and so forth, each having advantages and disadvantages, and have been implemented in a broad range of usages. Out of these, capacitive arrangements are configured to detect with high precision, and have been employed in many devices.

Japanese Patent Laid-Open No. 2008-236765 discloses disposing a touch operating member at the perimeter of a display screen on the rear face of an imaging apparatus in an L-shaped form, thereby addressing an issue of a finger coming into direct contact with the display screen when using the touch panel and soiling the screen. Also disclosed is technology for realizing reduced size and thickness of the device itself by reducing mechanical operating members, while improving operability.

Japanese Patent Laid-Open No. 2012-10061 discloses technology where a touch operating member is disposed on an upper face portion of an imaging apparatus, so the user can operate multiple shooting functions while holding the operating member.

However, the conventional technology disclosed in the aforementioned Japanese Patent Laid-Open Nos. 2008-236765 and 2012-10061 involves the user comprehending various functions set to the touch operating member to perform operations. It is thereby assumed that the user will view the display screen disposed on the rear face of the imaging apparatus to perform operations, and the touch operating member is disposed accordingly. Accordingly, there is an issue with highly functional imaging apparatuses where display devices are provided to the viewfinder, upper face cover, and so forth, in that the layout of touch operating members according to conventional technology makes it difficult to operate the touch operating members while viewing displays on the viewfinder or upper face cover. Particularly, while looking through the viewfinder, the user is performing blind-touch operations of the touch operating member, so there is a possibility of erroneous operations.

SUMMARY

The present disclosure provides electronic equipment having a touch operating member that can be operated while viewing at least two or more display monitors. The present disclosure also provides electronic equipment having a touch operating member that can be operated with comprehension of a touch detecting unit even while looking through the viewfinder.

According to an aspect of the present disclosure, electronic equipment includes a first operating member having a touch detecting face and configured to detect a touch operation and slide operation on a touch operating face, a first display unit provided on a first face where the touch operating face is disposed, a second display unit configured with a larger display area than the first display unit, and disposed in a direction orthogonal to a horizontal direction with regard to the touch operating face, and a grip portion configured for a user to grip, wherein the first operating member is disposed between the first display unit and the grip portion in the horizontal direction.

Further features of the present disclosure will become apparent from the following description of exemplary embodiments with reference to the attached drawings.

BRIEF DESCRIPTION OF THE DRAWINGS

FIG. 4A is a disassembled view thereof, FIG. 4B is a view illustrating attachment of a flexible board to the touch bar, and FIG. 4C is a cross-sectional view of the touch bar.

FIG. 5A is an upper view, and FIG. 5B is a rear view of the digital camera being held.

FIG. 6A is an upper view of the digital camera being held, and FIG. 6B is a rear view of the digital camera being held.

FIGS. 9A and 9B are schematic diagrams illustrating the sliding direction of the touch bar and the scrolling direction of the display unit.

FIG. 13A is an upper view thereof, and FIG. 13B is a rear view thereof.

DESCRIPTION OF THE EMBODIMENTS

First Embodiment

External View of Digital Camera 100

Figure 1A:
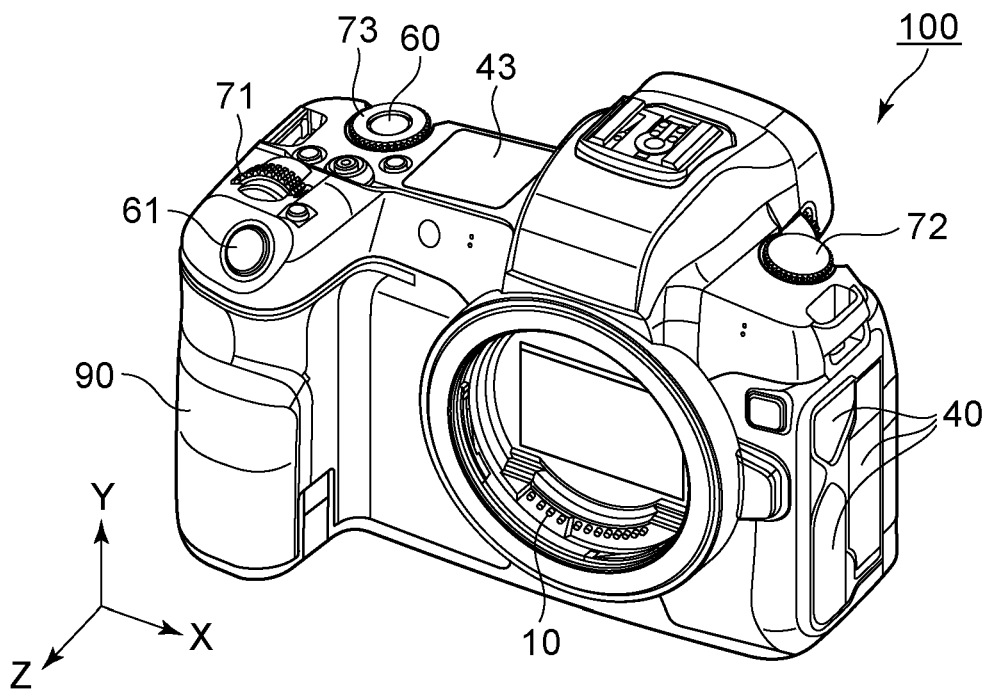
FIGS. 1A and 1B are external views of a digital camera according to a first embodiment.
Figure 1B:
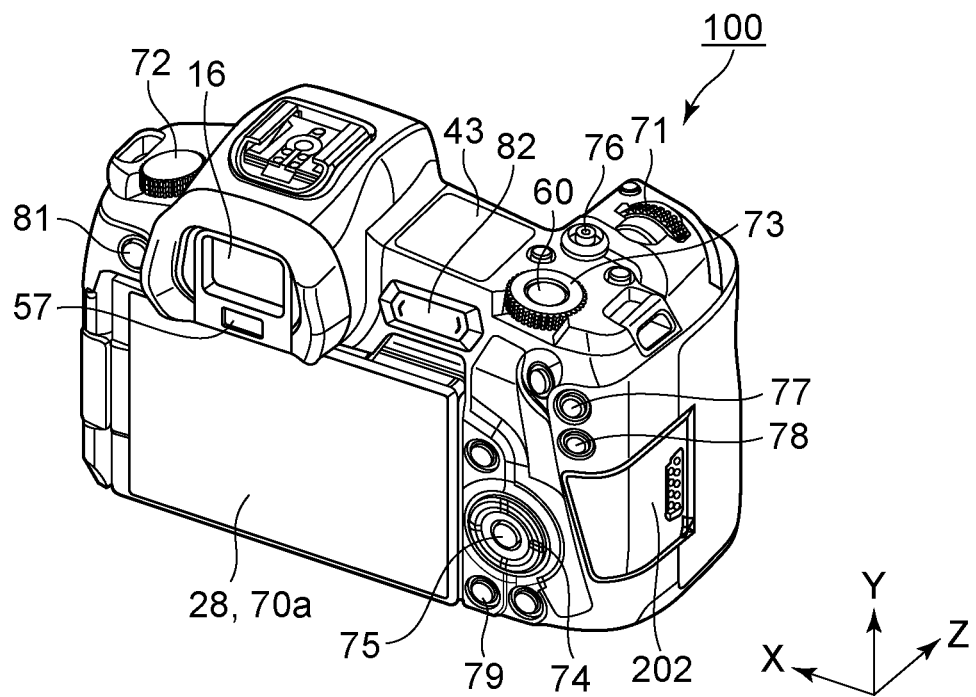

A first embodiment of the present disclosure will be described with reference to the drawings. FIGS. 1A and 1B are external views of a digital camera 100 serving as an example of an imaging apparatus to which the present disclosure can be applied. FIG. 1A is a frontal perspective view of the digital camera 100, and FIG. 1B is a rear perspective view of the digital camera 100.

A display unit 28 in FIG. 1B is a display unit provided to the rear face of the camera, to display images and various types of information. A touch panel 70a can detect touch operations made as to the display face (operating face) of the display unit 28.

A non-viewfinder display unit 43 is a display unit provided on the upper face of the camera, and displays various camera setting values such as shutter speed, f-number, and so forth.

A shutter button 61 is an operating unit for giving a shooting instruction. A mode selection switch 60 is an operating unit for switching among various types of modes.

A terminal cover 40 is a cover that protects a connector (omitted from illustration) for a connection cable or the like connecting external equipment and the digital camera 100.

A main electronic dial 71 is a rotational operating member included in an operating unit 70. Setting values such as shutter speed, f-number, and so forth, can be changed or the like by rotating this main electronic dial 71.

A power source switch 72 is an operating member that switches the power source for the digital camera 100 on and off.

A sub-electronic dial 73 is a rotational operating member included in the operating unit 70, and can be used for moving selection frames, image feeding, and so forth.

A directional pad 74 is included in the operating unit 70, and can be pressed at upper lower, left, and right portions (four-directional key). Operations can be performed in accordance with the portion of the directional pad 74 that has been pressed. A set button 75 is a press button that is included in the operating unit 70, and primarily is used for okaying selected items.

A moving image button 76 is used to instruct starting and stopping of shooting (recording) moving images. An automatic exposure (AE) lock button 77 is included in the operating unit 70. The exposure state can be fixed by pressing in a shooting standby state.

A zoom button 78 is an operating button included in the operating unit 70, for turning a zoom mode on and off for live view (LV) display in a shooting mode. Once the zoom mode is turned on, the LV image can be zoomed in and zoomed out by operating the main electronic dial 71. In playback mode, the zoom button 78 serves as an enlarging button to enlarge the playback image to a larger enlargement ratio.

A playback button 79 is an operating button included in the operating unit 70, for switching between the shooting mode and playback mode. When the playback button 79 is pressed in the shooting mode, the mode transitions to the playback mode, and the newest image out of images recorded on a recording medium 200 can be displayed on the display unit 28.

A menu button 81 is included in the operating unit 70. When the menu button 81 is pressed, a menu screen enabling various types of settings is displayed on the display unit 28. The user can intuitively perform various types of settings using the menu screen displayed on the display unit 28, and the directional pad 74 and set button 75.

A touch bar 82 is a linear touch operating member (line touch sensor) that can accept touch operations. The touch bar 82 is disposed at a position so as to be operable by the thumb of the right hand grasping a grip portion 90 serving as a holding portion. The touch bar 82 can accept tap operations (an operation of touching, and then releasing within a predetermined amount of time without moving), slide operations (an operation of touching, and then moving to a touch position while still in contact) to the left or right, and so forth. Note that the touch bar 82 is a separate operating member from the touch panel 70a, and does not have display functions.

A communication terminal 10 is a communication terminal for the digital camera 100 to communicate with the lens side (detachably mountable).

An eyepiece 16 is an eyepiece for a direct viewfinder (a viewfinder that is directly looked through). The user can confirm images displayed on an internal electronic viewfinder (EVF) 29 through the eyepiece 16.

A viewfinder proximity detecting unit 57 is a viewfinder proximity sensor that detects whether the eye of the photographer is in the proximity of the eyepiece 16.

A cover 202 is a cover for a slot accommodating the recording medium 200.

The grip portion 90 is a holding portion that has a shape enabling the user to easily grip the digital camera 100 in the right hand. The shutter button 61 and main electronic dial 71 are disposed at positions so as to be operable by the index finger of the right hand in a state where the grip portion 90 is being gripped using the little finger, ring finger, and middle finger of the right hand to hold the digital camera 100. The sub-electronic dial 73 and touch bar 82 are disposed at positions so as to be operable by the thumb of the right hand in the same state.

Block Diagram Illustrating Configuration Example of Digital Camera 100

Figure 2:
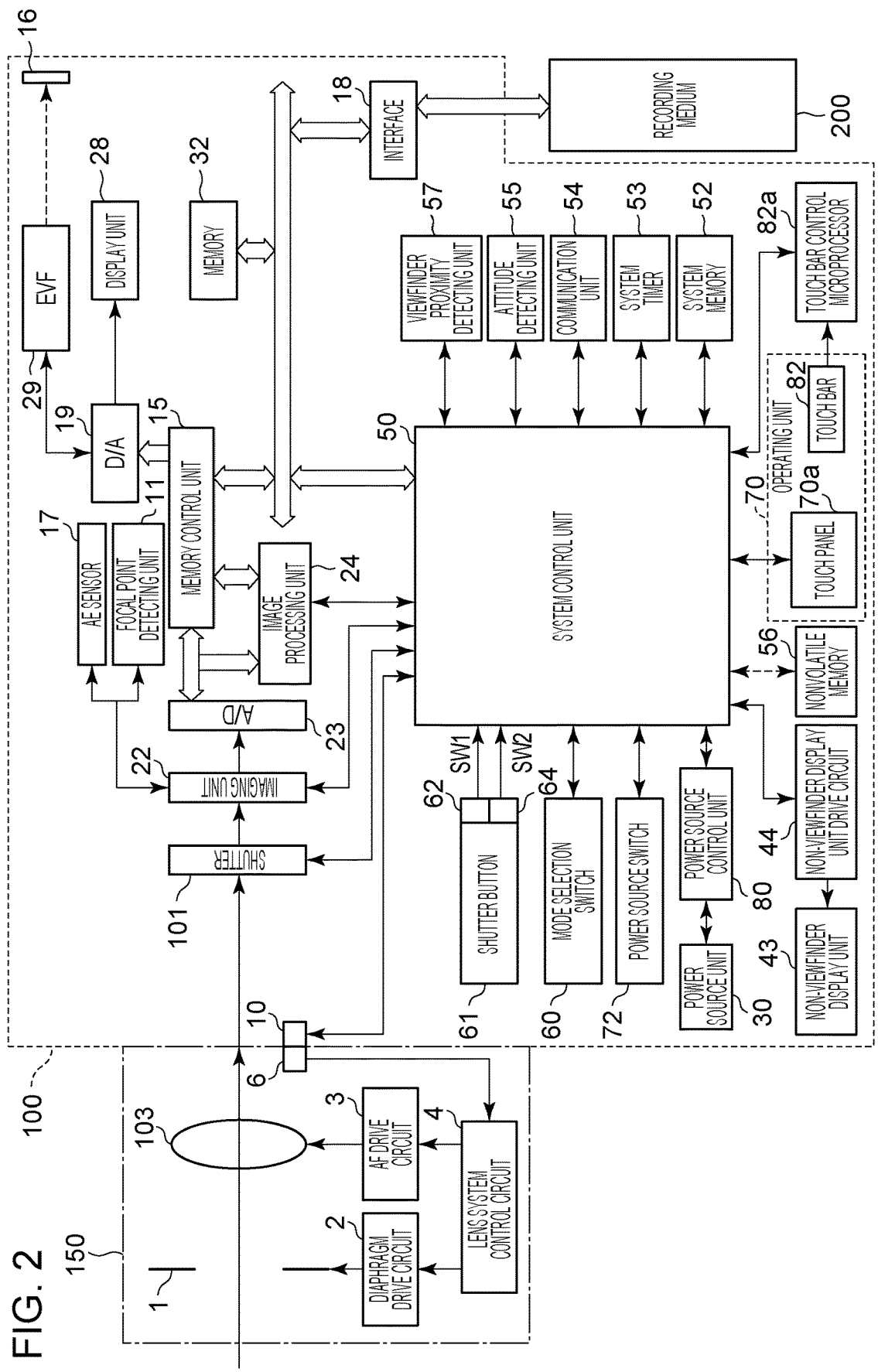
FIG. 2 is a schematic block diagram illustrating a hardware configuration example of the digital camera according to the first embodiment.

FIG. 2 is a block diagram illustrating a configuration example of the digital camera 100 according to the present embodiment. A lens unit 150 in FIG. 2 is a lens unit where exchangeable shooting lenses are mounted.

A lens 103 is usually made up of multiple lenses, but is illustrated as a single lens here for the sake of simplicity. A communication terminal 6 is a communication terminal for the lens unit 150 to communicate with the digital camera 100 side. The communication terminal 10 is a communication terminal for the digital camera 100 to communicate with the lens unit 150 side. The lens unit 150 communicates with a system control unit 50 via these communication terminals 6 and 10.

Control of a diaphragm 1 is performed by an internal lens system control circuit 4 via a diaphragm drive circuit 2, and the position of the lens 103 is changed via an automatic focus (AF) drive circuit 3, thereby performing focusing.

An AE sensor 17 performs light metering of the luminance of a subject through the lens unit 150.

A focal point detecting unit 11 outputs defocus amount information to the system control unit 50. The system control unit 50 controls the lens unit 150 based on this, thereby performing phase-difference AF.

The focal point detecting unit 11 may be a dedicated phase-difference sensor, or may be configured as an imaging plane phase-difference sensor of an imaging unit 22.

A shutter 101 is a focal plane shutter that can freely, or at least without meaningful restriction, control exposure time of the imaging unit 22 under control of the system control unit 50.

The imaging unit 22 is an imaging device configured of a charge-coupled device (CCD) or complementary metal-oxide silicon (CMOS) device or the like, that converts optical images into electrical signals.

An A/D converter 23 converts analog signals into digital signals. The A/D converter 23 is used for converting analog signals output from the imaging unit 22 into digital signals.

An image processing unit 24 subjects data from the A/D converter 23 or data from a memory control unit 15 to predetermined pixel interpolation, resizing processing such as reduction, and color conversion processing. The image processing unit 24 also subjects taken image data to predetermined computation processing. The system control unit 50 performs exposure control and ranging control based on the computation results obtained by the image processing unit 24. Accordingly, through-the-lens (TTL) AF processing, AE processing, and electronic flash (EF) pre-flashing is performed. The image processing unit 24 further performs predetermined computation processing using the taken image data, and performs TTL automatic white balance (AWB) processing based on the obtained computation results.

Output data from the A/D converter 23 is written to memory 32 via the image processing unit 24 and memory control unit 15, or directly written to the memory 32 via the memory control unit 15. The memory 32 stores image data obtained by the imaging unit 22 and converted into digital data by the A/D converter 23, and image data for display on the display unit 28 and EVF 29. The memory 32 has a sufficient storage capacity for storing a predetermined number of still images or a predetermined amount of time of moving images and audio. The memory 32 also serves as memory for image display (video memory).

A D/A converter 19 converts data for image display that is stored in the memory 32 into analog signals, and supplies to the display unit 28 and EVF 29. Thus, the image data for display that has been written to the memory 32 is displayed at the display unit 28 and EVF 29 via the D/A converter 19. The display unit 28 and EVF 29 perform displays in accordance with analog signals from the D/A converter 19, on display devices such as a liquid crystal display (LCD), organic electroluminescent display (ELD), or the like.

Digital signals that have been temporarily subjected to A/D conversion by the A/D converter 23 and stored in the memory 32 are subjected to analog conversion by the D/A converter 19, and thereafter sequentially transmitted to the display unit 28 or EVF 29 for display. Thus, LV display is performed. Hereinafter, images displayed in live view will be referred to as LV images.

Various setting values of the camera, such as shutter speed, f-number, and so forth, are displayed on the non-viewfinder display unit 43 via a non-viewfinder display unit drive circuit 44.

Nonvolatile memory 56 is electrically erasable and recordable memory. Electrically erasable programmable read-only memory (EEPROM) or the like, for example, is used. Constants, programs, and so forth for the system control unit 50 to operate, are stored in the nonvolatile memory 56. The term programs as used here refers to programs for executing various types of processing described later in the present embodiment.

The system control unit 50 is a control unit made up of at least one processor or circuit, and controls the entire digital camera 100. The processes of the present embodiment, which will be described later, are realized by executing the programs recorded in the aforementioned nonvolatile memory 56.

Random access memory (RAM), for example, is used for system memory 52, and constants, variables, programs read out from the nonvolatile memory 56, and so forth, for the system control unit 50 to operate, are loaded.

The system control unit 50 also performs display control by controlling the memory 32, D/A converter 19, display unit 28, and so forth.

A system timer 53 is a clocking unit that measures time used for various types of control, and time of a built-in clock.

The mode selection switch 60, a first shutter switch 62, a second shutter switch 64, and the operating unit 70 are operating units for input of various operation instructions to the system control unit 50.

The mode selection switch 60 switches the operation mode of the system control unit 50 to one of still image shooting mode, moving image shooting mode, playback mode, or the like.

Modes included in the still image shooting mode include automatic shooting mode, automatic scene determination mode, manual mode, aperture prioritized mode (Av mode), shutter speed prioritized mode (Tv mode), and programmable AE mode (P mode).

There are also various types of scene modes, custom modes, and so forth, that are shooting settings for different shooting scenes. The user can directly switch to one of these modes using the mode selection switch 60. Alternatively, an arrangement may be made where the mode selection switch 60 is used to temporarily switch to a list screen of shooting modes, and thereafter one of multiple modes displayed is selected, and other operating members are used to switch the mode. In the same way, the moving image shooting mode may include multiple modes.

The first shutter switch 62 goes on partway through operation of the shutter button 61 provided to the digital camera 100, at the so-called half-pressed state (shooting preparation instruction), and generates a first shutter switch signal SW1. The first shutter switch signal SW1 starts shooting preparation operations such as AF processing, AE processing, AWB processing, EF pre-flashing processing, and so forth.

The second shutter switch 64 goes on with operation of the shutter button 61 being completed, at the so-called full-pressed state (shooting instruction), and generates a second shutter switch signal SW2. Upon the second shutter switch signal SW2 being generated, the system control unit 50 starts the series of shooting processing operations, from reading signals from the imaging unit 22 up to writing the image that has been taken to the recording medium 200 as an image file.

The operating unit 70 is various types of operating members serving as input units for accepting operations from the user. The operating unit 70 includes at least the following operating units. Illustrated examples of the operating units are the shutter button 61, main electronic dial 71, power source switch 72, sub-electronic dial 73, directional pad 74, and the set button 75. Further illustrated are the moving image button 76, AF lock button 77, zoom button 78, playback button 79, menu button 81, and touch bar 82.

A power source control unit 80 is made up of a battery detecting circuit, a DC-DC converter, switching circuits for switching blocks to supply voltage to, and so forth, and performs detection of whether or not a battery is mounted, the type of the battery, and remaining charge in the battery. The power source control unit 80 also controls the DC-DC converter based on the detection results thereof and instructions from the system control unit 50, to supply necessary voltage to various parts including the recording medium 200 for necessary amount of time.

A power source unit 30 is made up of a primary battery such as an alkaline battery, lithium battery, or the like, a secondary battery such as a nickel-cadmium battery, nickel-metal hydride battery, lithium-ion battery, or the like, an AC adapter, and so forth.

A recording medium interface 18 is an interface for the recording medium 200 such as a memory card, hard disk, or the like. The recording medium 200 is a recording medium such as a memory card or the like, for recording images that have been shot, and is made up of semiconductor memory, a magnetic disk, or the like.

A communication unit 54 is externally connected wirelessly or by cable, and exchanges video signals and audio signals. The communication unit 54 is also configured to connect with a wireless local area network (LAN), the Internet, or the like. The communication unit 54 is further configured to communicate with external equipment via a wireless technology standard such as Bluetooth (a registered trademark) or a wireless personal area network technology such as Bluetooth Low Energy as well. The communication unit 54 is configured to transmit images taken by the imaging unit 22 (including LV images), and images recorded in the recording medium 200, and further can receive images and other various types of information from external equipment.

An attitude detecting unit 55 detects the attitude of the digital camera 100 as to the gravitational direction. Whether an image taken by the imaging unit 22 is an image taken with the digital camera 100 held landscape or an image taken holding the digital camera 100 portrait, can be distinguished based on the attitude detected by the attitude detecting unit 55. The system control unit 50 is configured to add orientation information in accordance with the attitude detected at the attitude detecting unit 55 to image files of images taken by the imaging unit 22, and rotate and record images. Examples of arrangements usable of the attitude detecting unit 55 include acceleration sensors, gyro sensors, and so forth. Movement of the digital camera 100 (panning, tilting, raising, whether still or not, etc.) can also be detected using the acceleration sensors, gyro sensors, and so forth, serving as the attitude detecting unit 55.

Description of Eyepiece 16 of Viewfinder

The viewfinder proximity detecting unit 57 is a viewfinder proximity detecting sensor that detects approaching of an eye (object) to the eyepiece 16 of the viewfinder (proximal) and retraction (distanced) thereof (proximity detection). The system control unit 50 switches the display (display state)/non-display (non-display state) of the display unit 28 and EVF 29 in accordance with the state detected by the viewfinder proximity detecting unit 57. More specifically, in at least a shooting standby state where switching of the display location is being automatically switched, the display unit 28 is set as the display location and display is turned on, and the EVF 29 is turned off while the eye is not in proximity with the eyepiece 16. On the other hand, display at the display unit 28 is turned off and the EVF 29 is set as the display location and display is turned on while the eye is in proximity with the eyepiece 16.

An infrared proximity sensor, for example, can be used for the viewfinder proximity detecting unit 57, to detect some sort of object approaching the eyepiece 16 of the viewfinder in which the EVF 29 is built in. In a case where an object is approaching, infrared rays cast by an emitting unit (omitted from illustration) of the viewfinder proximity detecting unit 57 are reflected and received at a photoreceptor (omitted from illustration) of the infrared proximity sensor. How far the object is from the eyepiece 16 (viewfinder proximity distance) can also be determined by the amount of infrared rays received. Thus, the viewfinder proximity detecting unit 57 performs proximity detection to detect the proximity distance of an object to the eyepiece 16.

In a case where an object is detected approaching the eyepiece 16 within a predetermined distance therefrom, from a non-proximity state, proximity of an eye is detected. In a case where an object of which proximity had been detected has moved away a predetermined distance or more, from the proximity state, distancing of the eye is detected. The threshold value at which proximity of an eye is detected, and the threshold value at which distancing of an eye is detected, may be different, with a hysteresis provided, for example. Once proximity of an eye is detected, the state is a proximity state until distancing of the eye is detected. Once distancing of the eye is detected, the state is a distanced state until proximity of the eye is detected. Note that an infrared proximity sensor is but one example, and other sensors may be employed for the viewfinder proximity detecting unit 57 as long as proximity of an eye or an object, that can be deemed to be proximity of an eye, can be detected.

Description of Touch Panel 70*a*

The touch panel 70*a* can be integrally configured with the display unit 28. For example, the touch panel 70*a* is configured having a light transmittance so as not to impede display of the display unit 28, and is attached to the top layer of the display face of the display unit 28. The input coordinates on the touch panel 70*a* are correlated with the display coordinates on the display screen of the display unit 28. Accordingly, a graphical user interface (GUI), which gives the impression of the user being able to directly operate the screen displayed on the display unit 28, can be provided.

The system control unit 50 can detect the following operations and states regarding the touch panel 70*a*.

A finger or pen that has not been in touch with the touch panel 70*a* has newly touched the touch panel 70*a*, i.e., a touch has been started (referred to as touch-down).

A finger or pen is in a state touching the touch panel 70*a* (referred to as touch-on).

A finger or pen is moving while being in a state touching the touch panel 70*a* (referred to as touch-move).

A finger or pen that had been in a state touching the touch panel 70*a* has moved away, i.e., end of touch (referred to as touch-up).

A state where nothing is touching the touch panel 70*a* (referred to as touch-off).

When touch-down is detected, touch-on is also detected at the same time. Unless touch-up is detected after touch-down, touch-on normally continues to be detected. Touch-move is detected in a state where touch-on is detected. Even if touch-on is detected, touch-move is not detected unless the touch position moves. Touch-off is after touch-up of all fingers or pens in touch has been detected.

These operations and states, and positional coordinates of a finger or pen touching the touch panel 70*a*, are notified to the system control unit 50 via an internal bus. The system control unit 50 determines what sort of operations (touch operations) have been made on the touch panel 70*a*, based on the information notified thereto.

The direction of movement of the finger or pen moving over the touch panel 70a during a touch-move can be determined for each of the vertical component and horizontal component on the touch panel 70a, based on change in the positional coordinates. In a case where a touch-move of a predetermined distance or longer has been detected, a slide operation is determined to have been performed.

An operation of quickly moving a finger over the touch panel 70a for a certain distance or so while in touch and moving away is called flicking. The term flicking for this operation comes from the way in which the surface of the touch panel 70a is flicked by the finger. In a case where a touch-move has been detected for a predetermined distance or more, at a predetermined speed or more, ending with a touch-up being detected, flicking can be determined to have been performed (flicking can be determined to have been performed after a slide operation).

Further, performing a touch operation of touching multiple places (e.g., two points) at the same time, and bringing the touch positions closer to each other is referred to as pinch-in, while a touch operation of distancing the touch positions from each other is referred to as pinch-out. Pinch-out and pinch-in are collectively referred to as pinch operations (or simply pinching).

There are various types of touch panels, such as resistive, capacitive, surface acoustic wave, infrared, electromagnetic induction, image recognition, optical sensor, and so forth, any of which can be used for the touch panel 70a. Some types detect touch by contact as to the touch panel 70a, while other types detect touch by proximity of a finger or pen to the touch panel 70a, and either may be used.

The system control unit 50 calculates positional coordinates of a thumb touching the touch bar 82, based on output information from the touch bar 82. The system control unit 50 can further detect the following operations and states regarding the touch bar 82.
- A thumb that has not been in touch with the touch bar 82 has newly touched the touch bar 82, i.e., a touch has been started (referred to as touch-down).
- A thumb is in a state touching the touch bar 82 (referred to as touch-on).
- A thumb is moving while being in a state touching the touch bar 82 (referred to as touch-move).
- A thumb that had been in a state touching the touch bar 82 has moved away, i.e., the end of a touch (referred to as touch-up).
- A state where nothing is touching the touch bar 82 (referred to as touch-off).

When touch-down is detected, touch-on is also detected at the same time. Unless touch-up is detected after touch-down, touch-on normally continues to be detected. Touch-move is detected in a state where touch-on is detected. Even if touch-on is detected, touch-move is not detected unless the touch position moves. Touch-off is after touch-up of the thumb in touch has been detected.

The system control unit 50 determines what sort of operations (touch operations) have been made on the touch bar 82, based on these operations and states, and positional coordinates. Horizontal-direction movement on the touch bar 82 is detected for a touch-move. In a case where movement of a predetermined distance or longer is detected, a slide operation is determined to have been performed. In a case where the touch bar 82 is touched by a thumb, and the touch is released within a predetermined amount of time without performing a slide operation, a tap operation is determined to have been performed.

The touch bar 82 according to the present embodiment is a capacitive touch sensor. However, the touch bar 82 may be a different type of touch sensor, such as resistive, surface acoustic wave, infrared, electromagnetic induction, image recognition, optical sensor, and so forth.

Operations Using Touch Bar 82

Figure 10A:
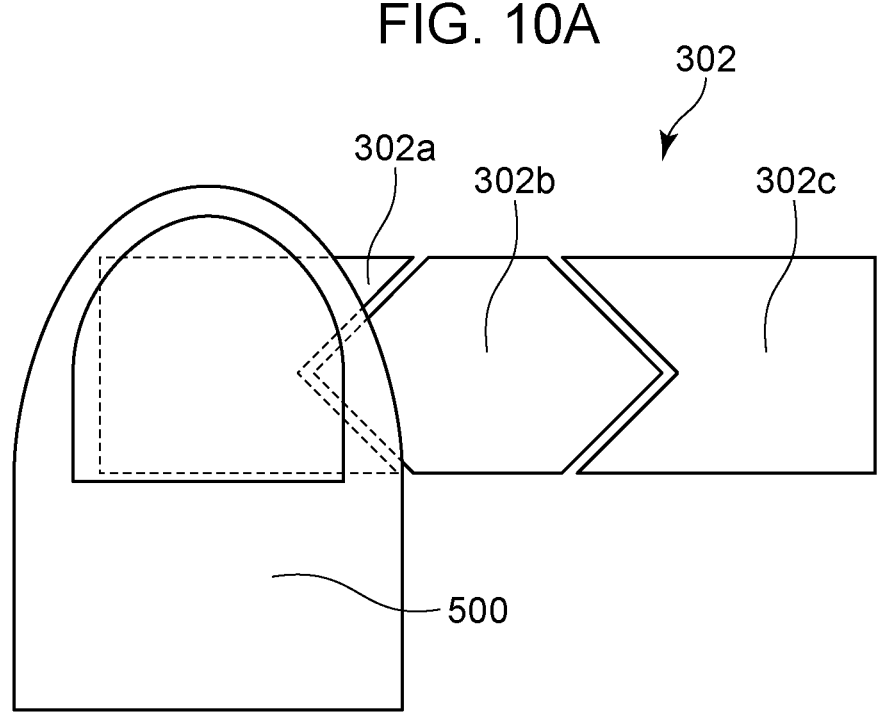
FIGS. 10A and 10B are conceptual diagrams of tap operations.
Figure 10B:
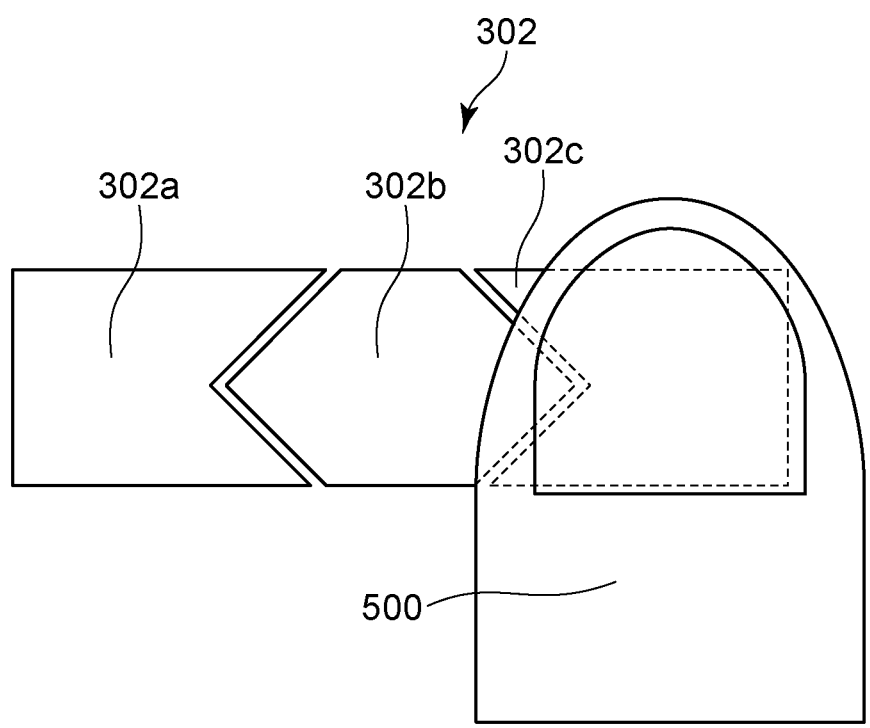
Figure 11A:
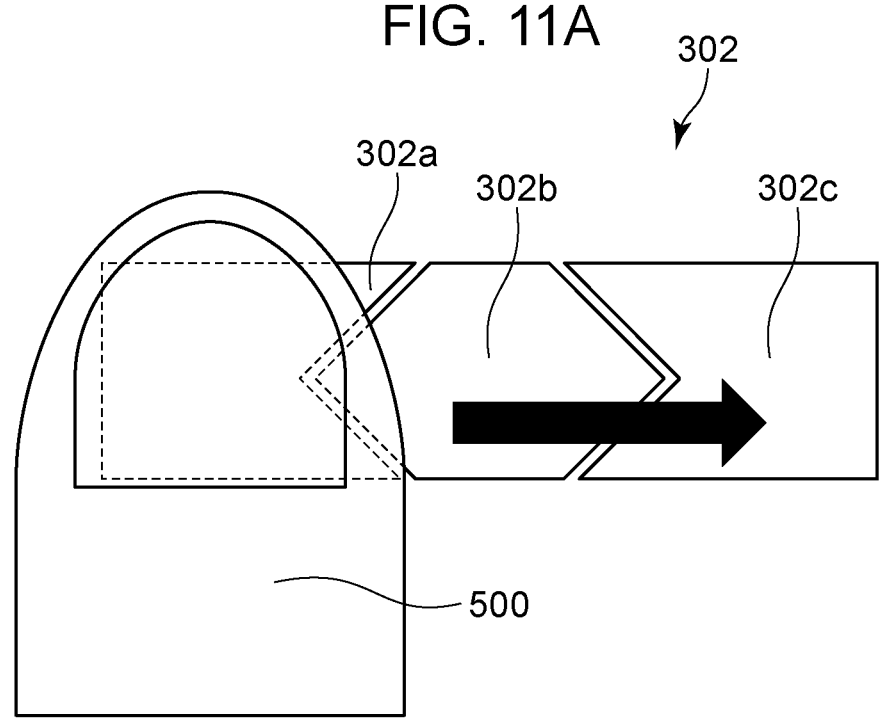
FIGS. 11A and 11B are conceptual diagrams of slide operations.
Figure 11B:
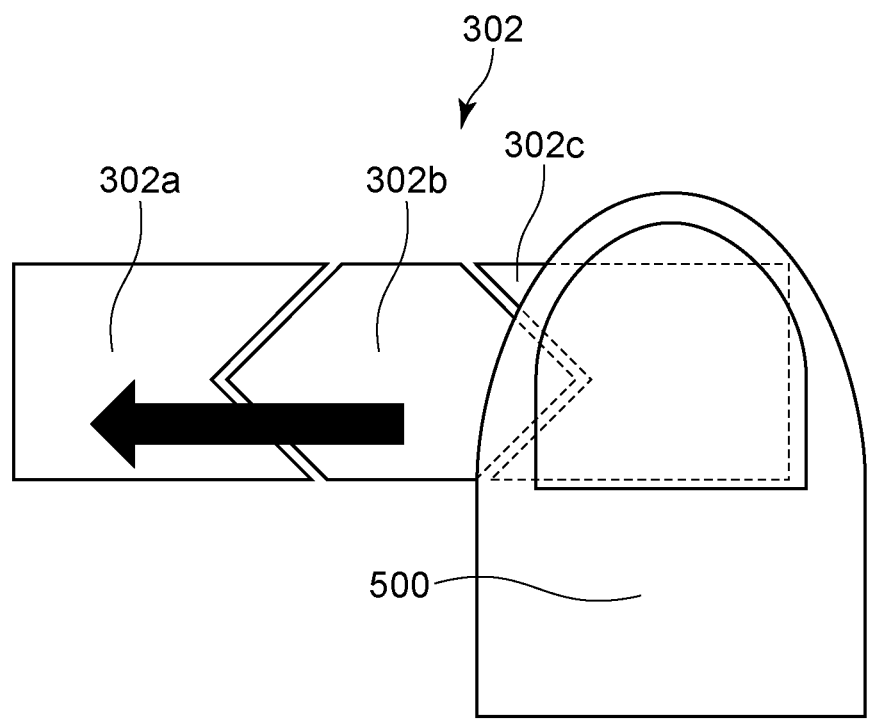
Figure 12:
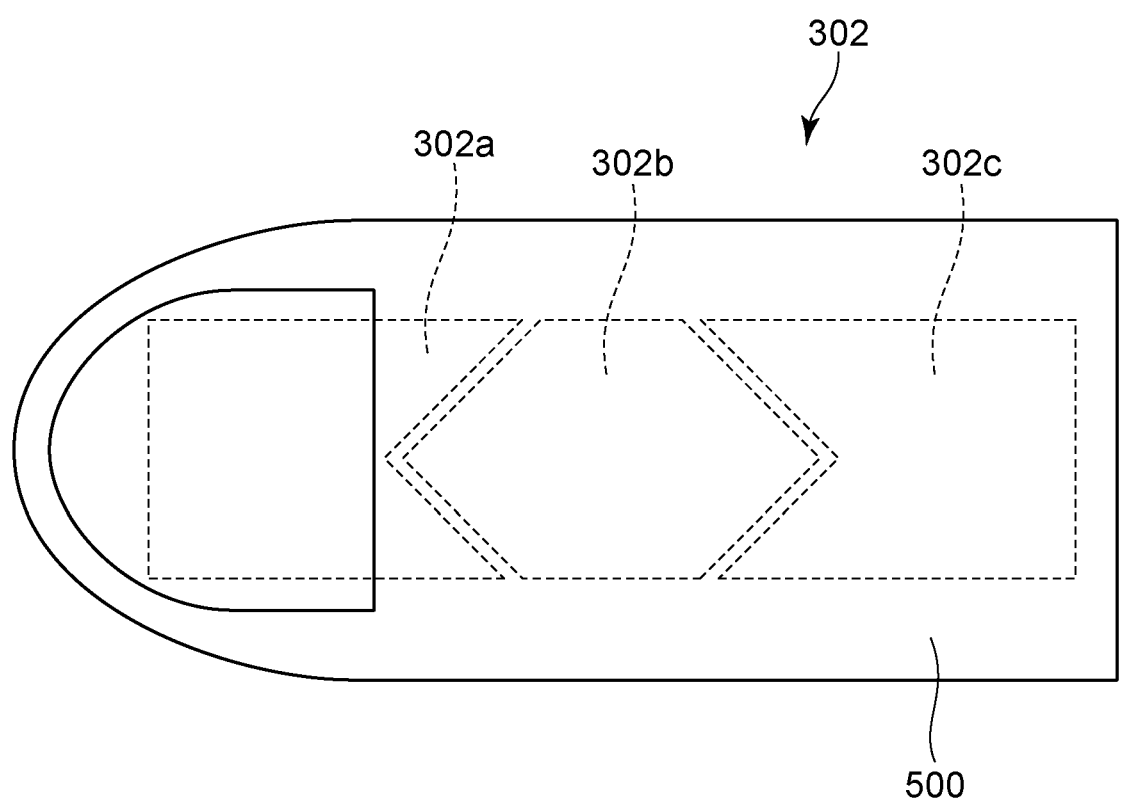
FIG. 12 is a conceptual diagram of full-area pressing operations.

Operations using the touch bar 82 will be described below in detail with reference to FIGS. 10A through 12. FIGS. 10A and 10B are conceptual diagrams of tap operations, FIGS. 11A and 11B are conceptual diagrams of slide operations, and FIG. 12 is a conceptual diagram of full-area pressing operations. The outlines of the touch bar 82 and flexible board 301 are omitted throughout FIGS. 10A through 12. Only a touch sensor electrode 302, and an operating thumb 500 by which the user performs operations, are illustrated.

The touch sensor electrode 302 is made up of three electrodes in order from the side closer to the eyepiece 16, which are a first touch sensor electrode 302a, a second touch sensor electrode 302b, and a third touch sensor electrode 302c. The touch sensor electrode 302 detects change in capacitance by the operating thumb 500 that performs user operations, whereby tap operations, slide operations, and full-area pressing operations can be performed.

In reality, touch detection is performed by the operating thumb 500 of the user coming into contact with the touch bar 82 disposed at the near side of the touch sensor electrode 302. However, description will be made below that touch detection is performed by the operating thumb 500 coming into contact with the touch sensor electrode 302, in order to simplify description regarding tap operations, slide operations, and full-area pressing operations.

Tap Operations

FIGS. 10A and 10B are conceptual diagrams of tap operations, where FIG. 10A is a conceptual diagram of a left tap operation, and FIG. 10B is a conceptual diagram of a right tap operation. The operating thumb 500 of the user comes into contact with the first touch sensor electrode 302a, and then moves away, as illustrated in FIG. 10A, which is detected as a left tap operation. In the same way, the operating thumb 500 of the user comes into contact with the third touch sensor electrode 302c, and then moves away, as illustrated in FIG. 10B, which is detected as a right tap operation.

Although two tap operations of left tap operation and right tap operation have been described in the present embodiment, this is not restrictive. A middle tap operation may be provided using the second touch sensor electrode 302b.

Slide Operations

FIGS. 11A and 11B are conceptual diagrams of slide operations, where FIG. 11A is a conceptual diagram of a right slide operation, and FIG. 11B is a conceptual diagram of a left slide operation. The operating thumb 500 comes into contact with the first touch sensor electrode 302a of the touch sensor electrode 302, and then moves toward the direction of the third touch sensor electrode 302c, as illustrated in FIG. 11A, which is detected as a right slide operation. In the same way, the operating thumb 500 comes into contact with the third touch sensor electrode 302c, and then moves toward the direction of the first touch sensor electrode 302a, as illustrated in FIG. 11B, which is detected as a left slide operation.

The start position of slide operations is not restricted to the first touch sensor electrode 302a or third touch sensor electrode 302c, and a slide operation may start from contact with the second touch sensor electrode 302b. That is to say, movement where the operating thumb 500 comes into contact with the second touch sensor electrode 302b, and then moves toward the direction of the third touch sensor electrode 302c, may be detected as a right slide operation. Similarly, movement where the operating thumb 500 of the user comes into contact with the second touch sensor electrode 302b, and then moves toward the direction of the first touch sensor electrode 302a, may be detected as a left slide operation.

Full-Area Pressing Operations

FIG. 12 is a conceptual diagram of a full-area pressing operation. All of the first touch sensor electrode 302a, second touch sensor electrode 302b, and third touch sensor electrode 302c of the touch sensor electrode 302 are pressed by the operating thumb 500 at once, as illustrated in FIG. 12, which is detected as a full-area pressing operation. While the operating thumb 500 is pressed generally perpendicularly as to the touch sensor electrode 302 in tap operations and slide operations, the operating thumb 500 is pressed generally parallel as to the touch sensor electrode 302 in full-area pressing operations. That is to say, this is an operation that is relatively difficult to perform in comparison with tap operations and slide operations, but on the other hand, this is an operation that the user cannot perform without intent to do so.

The user does not necessarily have to touch all of the touch sensor electrode 302 as illustrated in FIG. 12 to perform full-area pressing operations. An arrangement may be made a full-area pressing operation is recognized even if part of the first touch sensor electrode 302a and part of the third touch sensor electrode 302c is not being touched.

EXAMPLES

An example of the present disclosure will be described with reference to FIGS. 3 through 6B. Provided is the touch bar 82 (first operating member) having a touch detecting face, configured to detect touch operations and slide operations on a touch operating face, in the present embodiment. Also provided are eyepieces 16 and 29 serving as a first display unit provided on the rear face of the imaging apparatus serving as a first face where the touch operating face is disposed.

Also provided is the display unit 28 serving as a second display unit, configured with a larger display area than the first display units 16 and 29, and disposed in a direction orthogonal to a horizontal direction (sliding direction) with regard to the touch operating face. The display area of the eyepiece 16 is small in comparison with the display area of the display unit 28, so a space is left open in the horizontal direction between the eyepiece 16, and the grip portion 90 having a thumb standby position 300 (hereinafter also referred to as "grip portion 90 and 300"), in which the touch bar 82 (first operating member) is provided for improved/refined operability by the user between the first display units 16 and 29 and the grip portion 90 and 300 in the horizontal direction (sliding direction), the grip portion 90 and 300 having been provided as a grip portion for the user to grip.

The display area of the second display unit (touch panel) 28 is the largest of the display areas, followed by the display area of the second display unit (upper face panel) 43 and the first display units (eyepiece) 16 and 29, in that order.

The touch bar 82, eyepiece 16, and second display unit (touch panel) 28 are disposed on the same face, with the eyepiece 16 and second display unit (touch panel) 28 being disposed at positions protruding beyond the touch operating face in a direction orthogonal to the direction of slide operations.

Description of Layout Position and Internal Configuration of Touch Bar 82

Figure 3:
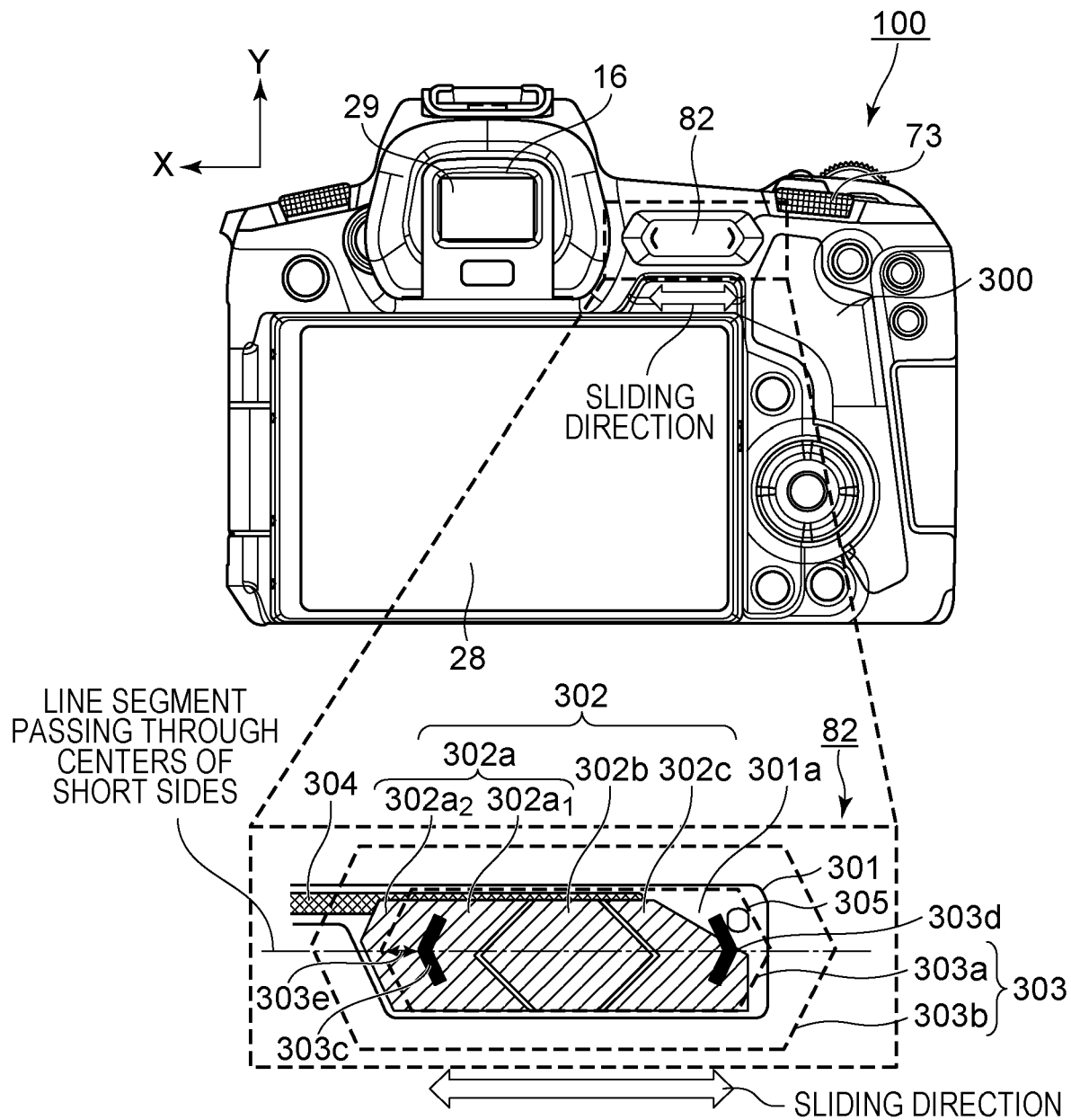
FIG. 3 illustrates the rear face of the digital camera and the internal configuration of a touch bar according to the first embodiment.

FIG. 3 is a diagram illustrating the layout position and internal configuration of the touch bar 82 in the digital camera 100 serving as the imaging apparatus (electronic equipment) according to the present example. The touch bar 82 is disposed on the rear side of the digital camera 100, adjacent to the eyepiece 16, as illustrated in FIG. 3. The touch bar 82 is also disposed adjacent to the sub-electronic dial 73, and to a thumb standby position 300 which is the position of the thumb in a case of gripping the grip portion 90 with the right hand to hold the camera.

The enlarged view in FIG. 3 is the internal configuration of the touch bar 82, including the touch sensor electrode 302 serving as an arrangement to detect touch operations, whereby tap operations and slide operations to the left and right (the sliding direction illustrated in FIG. 3). The touch detecting face of the touch sensor electrode 302 is laid out divided into the three of 302a, 302b, and 302c, from the side of the eyepiece 16. Although the touch detecting face of the touch sensor electrode is divided into three in the description of the present example, this is not restricted to being divided into three, and may be divided into two, four, or more.

The dotted lines in the enlarged view in FIG. 3 show the outline of a keytop 303, which is an external appearance part of the touch bar 82. The single-dot dashed line is a line segment passing through the centers of the short sides (Y direction) of the touch sensor electrode 302.

A region encompassed by a keytop outline 303a is a first operating face that overlaps the touch sensor electrode 302 and that is recognized by the user as a region configured to execute touch detection. A region encompassed by the keytop outline 303a and a keytop outline 303b does not overlap the touch sensor electrode 302, and thus is a second operating face that is recognized by the user as a non-detection region not configured to execute touch detection.

Dogleg (arrow-shaped) indicators 303c and 303d are provided to the left and right edges (X-direction edges) of the first operating face encompassed by the keytop outline 303a. The sliding direction of the touch bar 82 is shown so that the user can understand. The indicators 303c and 303d are either raised or recessed, so that the user will be able to tell the left and right edges by touch when sliding the thumb over the touch bar 82 in contact therewith. The reason why a touch-non-detection region that does not detect touches is provided to the keytop 303 in the present example will be described later.

The touch sensor electrodes are formed of copper foil or the like on the flexible board 301, and connected to the system control unit 50 by copper foil wiring 304 on the flexible board 301. The system control unit 50 calculates positional coordinates based on output information from the touch bar 82, i.e., information input from the first through third touch sensor electrodes 302a, 302b, and 302c, as described above. What sort of operations have been performed at the touch bar 82 is determined from operations and states.

The first touch sensor electrode 302a has an area that is relatively larger than that of the touch sensor electrode 302c, and input is performed more readily. In the present example, the area of the first touch sensor electrode 302a is approximately 36 mm$^2$, the area of the second touch sensor electrode 302b is approximately 34 mm$^2$, and the area of the third touch sensor electrode 302c is approximately 26 mm$^2$. The touch sensor electrode 302a is set to have an area of 1.3 to 1.4 times that of the touch sensor electrode 302c, and the relation in size among the touch sensor electrodes is set to be 302a>302b>302c.

The first touch sensor electrode 302a has a shape that extends beyond the first operating face indicated by the keytop outline 303a toward the eyepiece 16 side. A region encompassed by the keytop outline 303a of the first touch sensor electrode 302a is a first touch detection region $302a_1$, and the region extending out from the keytop outline 303a is a second touch detection region $302a_2$. A region that does not overlap the second touch detection region $302a_2$ in the second operating face encompassed by the keytop outline 303a and keytop outline 303b is a first touch-non-detecting region.

The first touch sensor electrode 302a is far away from the thumb standby position 300, distance-wise. Accordingly, the thumb of the user tends to be less firmly in contact, so the second touch detection region $302a_2$ has been provided to enlarge the electrode area, in order to obtain stable detection even if there is not sufficient touching area. However, if the extending amount of the second touch detection region $302a_2$ is excessively great, this can lead to erroneous detection, such as detecting touch when the user is touching the second operating face of the keytop 303. Accordingly, the extending amount of the first touch sensor electrode 302a is kept to a size that is not larger than a width 303e between the left edge of the first operating face of the keytop 303 and the indicator 303c. Thus, the first touch sensor electrode 302a can be adjusted to provide a desired or predetermined ease of input, by cancelling out the distance from the thumb standby position 300 and difficulty of input due to being adjacent to the eyepiece 16. This adjustment enables calculation of positional coordinates and determination of operations to be performed accurately as to the intent of operations by the user.

The third touch sensor electrode 302c has a shape where close to the sub-electronic dial 73 has been cut off. More specifically, the third touch sensor electrode 302c has been cut such that a grade is formed where the cut region increases the closer to the sub-electronic dial 73 in the X-axis direction. Accordingly, the first touch sensor electrode 302a has a smaller area than the first operating face indicated by the keytop outline 303a, and the cut region is a second touch-non-detecting region 301a.

Note however, that if the third touch sensor electrode 302c is excessively smaller than the first operating face, a situation may occur where even though the user has touched the first operating face that the user recognizes to be a region configured to execute touch detection, no touch is detected. Accordingly, the third touch sensor electrode 302c is arranged to overlap the indicator 303d of the touch detection region of the keytop 303 by half or more. Accordingly, unintended input occurs less readily at the third touch sensor electrode 302c even in a case where the user operates the sub-electronic dial 73 with momentum.

Further, a positioning hole 305 is provided to the flexible board 301 in free space created by narrowing the third touch sensor electrode 302c.

The imaging apparatus (electronic equipment) is provided with first display units 16 and 29 provided on the rear side face where the keytop 303 of the touch bar 82 is provided.

The imaging apparatus (electronic equipment) is provided with second display units 28 and 43, disposed in a direction orthogonal to the slide operation direction of the touch sensor electrode 302 as to the keytop 303 of the touch bar 82.

The keytop 303 is non-electroconductive. The touch sensor electrode 302 is disposed on the inner side of the keytop 303.

The imaging apparatus (electronic equipment) is provided with electroconductive outer covers 404 and 406 disposed so as to cover the periphery of the keytop 303.

The touch sensor electrode 302 is divided into at least two detecting faces of the first touch sensor electrode 302a through an N'th touch sensor electrode 302n in order from the first display unit side in the direction of slide operations. The grip portion 90 that the user grips is the closest to the N'th touch sensor electrode 302n out of the at least two touch sensor electrodes in the direction of slide operations. N is a natural number, and in the case of FIG. 3, N=3. The grip portion 90 is closest to the third touch sensor electrode 302c in the direction of slide operations.

The second display unit 28 is provided on the rear side face where the keytop 303 is disposed. The digital camera 100 is illustrated as viewed from the rear side. The second display unit 28 is disposed so the scrolling direction of setting items displayed on the second display unit 28 that can be operated by the touch bar 82, and the direction of slide operation of the keytop 303, match.

The second display unit 43 is disposed on the upper face of the digital camera 100, that is different from the face on the rear side where the keytop 303 is disposed. The second display unit 43 is disposed so the scrolling direction of setting items displayed on the second display unit 43 that can be operated by the touch bar 82, and the direction of slide operation of the keytop 303, match.

The second display unit 28 is a touch panel. When viewed from the rear side of the electronic equipment, the second display unit 28 is disposed so the direction of slide operation of the touch panel face of the second display unit 28 and the direction of slide operation of the keytop 303 match.

The sub-electronic dial 73 is provided at a position closest to the N'th touch sensor electrode 302n out of the at least two touch sensor electrodes, in the direction of slide operation of the keytop 303 (see FIG. 3). N=3 in FIG. 3, so the sub-electronic dial (rotational operating member) 73 is provided at a position closest to the third touch sensor electrode 302c.

When viewed from the rear side of the electronic equipment, the sub-electronic dial (rotational operating member) 73 is provided so that the rotation direction of the sub-electronic dial 73 and the direction of slide operation of the keytop 303 match. When viewed from the rear side of the electronic equipment, the touch bar 82 is disposed on the course of the thumb of the user rotationally operating the sub-electronic dial 73.

The first display units 16 and 29 are the eyepiece 16 that is disposed adjacent to the keytop 303 in the direction of slide operations, and that protrudes toward the rear side as to the keytop 303 of the touch bar 82. When viewed from the rear side of the electronic equipment, the eyepiece 16 is disposed so that the scrolling direction of setting items displayed in the eyepiece 16 that can be operated by the touch bar 82, and the direction of slide operation of the keytop 303, match.

The touch sensor electrode 302 is isolated from the outer covers 404 and 406 so that the touch sensor electrode 302 is electrically insulated from the outer covers 404 and 406.

The keytop 303 has a first operating face 303a that overlaps the touch sensor electrode 302, and a second operating face 303b that is disposed on the outer periphery of the first operating face 303a and that does not overlap the touch sensor electrode 302.

The first operating face 303a and second operating face 303b differ with regard to one of amount of protrusion in the rear direction, texture, and color.

The texture of the first operating face 303a and the texture of the second operating face 303b differ.

The surface color of the first operating face 303a and the surface color of the second operating face 303b differ.

The first operating face 303a protrudes farther in the rear direction of the electronic equipment as compared to the second operating face 303b.

The height of the first operating face 303a in the direction toward the rear side is higher than the height of the grip portion 90 and thumb standby position 300 in the direction toward the rear side, and is lower than the height of the eyepiece 16 in the direction toward the rear side.

The material of the keytop 303 is a resin that contains a glass filler.

The length of the first operating face 303a in the direction of slide operations is longer than the thumb standby position 300, situated on the rear side face of the electronic equipment, in the direction of slide operations.

The length of the first operating face 303a in the direction of slide operations is longer than the rotational operation width of rotational operations of the sub-electronic dial 73.

When viewed from the rear side of the electronic equipment, the second operating face 303b, first operating face 303a, and second operating face 303b, are arrayed in order from the sub-electronic dial 73, in a direction orthogonal to the direction of slide operations.

The length of the first operating face 303a in a direction orthogonal to the direction of slide operations is longer than the length of the sub-electronic dial 73 in a direction orthogonal to the direction of slide operations on the touch detecting face.

The length of the second operating face 303b in a direction orthogonal to each of the direction of slide operations is shorter than the length of the sub-electronic dial 73 in a direction orthogonal to the direction of slide operations on the touch direction face.

The first touch sensor electrode 302a is provided across the first operating face 303a and the second operating face 303b provided adjacent to the outer edge of the first operating face 303a at the eyepiece 16 side in the direction of slide operations.

The first operating face 303a protrudes farther to the rear side of the electronic equipment as compared to the second operating face 303b.

When viewed from the rear side of the electronic equipment, the first touch detecting region where the first operating face 303a and the first touch sensor electrode 302a overlap is a wider area than the second touch detection region where the second operating face 303b and the first touch sensor electrode 302a overlap.

The sub-electronic dial (second operating member) 73 is provided disposed adjacent to the operating face of the touch bar (first operating member) 82 in the direction of slide operations.

The sub-electronic dial 73 is closest to the N'th touch sensor electrode 302n out of the at least two touch sensor electrodes in the direction of slide operations.

A line segment is defined extending in the direction of slide operations, and passing through midpoints of the short sides of the touch electrode face of the touch sensor electrode 302.

In this case, a region of the N'th touch sensor electrode 302n that is closer to the sub-electronic dial 73 with the line segment as a reference is a first region. With the region of the N'th touch sensor electrode 302n on the side farther from the sub-electronic dial 73 as a second region, the surface area of the first region is narrower than the surface area of the second region.

When viewed from the rear side of the electronic equipment, the first operating face 303a has a first touch detection region where the first operating face 303a overlaps the touch sensor electrode 302, and a first touch-non-detection region where the first operating face 303a does not overlap the touch sensor electrode 302.

The second operating face 303b has a second touch detection region where the second operating face 303b overlaps the touch sensor electrode 302, and a second touch-non-detection region where the second operating face 303b does not overlap the touch sensor electrode 302.

When viewed from the rear side of the electronic equipment, the second touch-non-detection region, second touch detection region, and second touch-non-detection region, are arrayed in order from the eyepiece 16, in the direction of slide operations.

The width in the direction of slide operations of the second touch-non-detection region is wider than the width of the second touch detection region in the direction of slide operations.

When viewed from the rear side of the electronic equipment, the first touch indicator 303c is provided at the touch detection region where the first operating face 303a and the first touch sensor electrode 302a overlap.

When viewed from the rear side of the electronic equipment, the second touch indicator 303d is provided at the touch detection region where the first operating face 303a and the N'th touch sensor electrode 302n overlap.

The first touch indicator 303c is provided in the first touch detection region.

The width of the second touch detection region in the direction of slide operations is shorter than a length 303e from the first touch indicator 303c to the second touch detection region.

The second touch indicator 303d is provided across both regions of the touch detection region where the first operating face 303a and the N'th touch sensor electrode 302n overlap, and the touch-non-detection region where the first operating face 303a and the N'th touch sensor electrode 302n do not overlap.

The area of the second touch indicator 303d provided in the touch detection region is wider than the area of the second touch indicator 303d provided in the touch-non-detection region.

The touch bar 82 overlaps the operating face of the display unit 28 in the sliding direction (X direction), but does not overlap the operating face of the display unit 28 in a direction orthogonal to the sliding direction (Y direction).

When viewed from the rear side of the electronic equipment, the touch bar 82 is disposed at a position recessed toward the front side (Z direction) with regard to the operating face of the display unit 28.

When defining a line segment extending in the sliding direction, and passing through midpoints of the short sides of the touch sensor electrode 302, a region of the first touch-non-detection region that is farther from the display unit 28 with the line segment as a reference, is a first region.

When a region of the first touch-non-detection region that is closer to the display unit 28 is a second region, and when viewed from the rear side of the electronic equipment, the width of the first region orthogonal to the direction of slide operations is wider than the width of the second region orthogonal to the direction of slide operations.

Description of Assignment Functions of the Touch Bar 82

Now, unless determination of operations is not made accurately with regard to the intent of operations by the user, erroneous operations will occur. However, consistency of operations as to intent may suffer depending on the distance of the touch bar 82 from the thumb standby position 300 and the positional relation as to other members on the equipment. For example, ease of touching changes depending on the distance from the thumb standby position 300. Specifically, the touch bar 82 is easy to touch near the thumb standby position 300, but the closer from that position toward the eyepiece 16, the more the thumb needs to be stretched, and the more difficult touching becomes.

The eyepiece 16 is a direct viewfinder where images displayed on the internal EVF 29 are viewed, as described above. However, the eyepiece 16 has a protruding shape projecting to the outer cover side (rear side) so that a suitable eyepoint can be secured, and that the nose does not readily come into contact with the display unit 28 when in proximity. In the present example, the eyepiece 16 is protruding 15 mm or more in the Z direction as compared to the touch face of the touch bar 82. Accordingly, touch input to the edge of the touch bar 82 adjacent to the eyepiece 16 is difficult. Particularly with regard to slide operations, in a case where input cannot be performed from edge to edge, the number of steps of setting values is reduced, so the effects thereof are pronounced. Accordingly, while a protruding shape of 15 mm or more, which is relatively great, has been exemplified in the present example, effects on operability are manifested even with a protruding shape of around 1 mm or more.

Also, the sub-electronic dial 73 is a rotational operating member as described above. Input of multiple stages can be performed by rotating in the horizontal direction (X-axis direction) using the thumb of the right hand. However, there is the possibility of unintentionally touching the adjacent touch bar 82 at the time of this operation.

Description of Detailed Configuration of Touch Bar 82

Figure 4A:
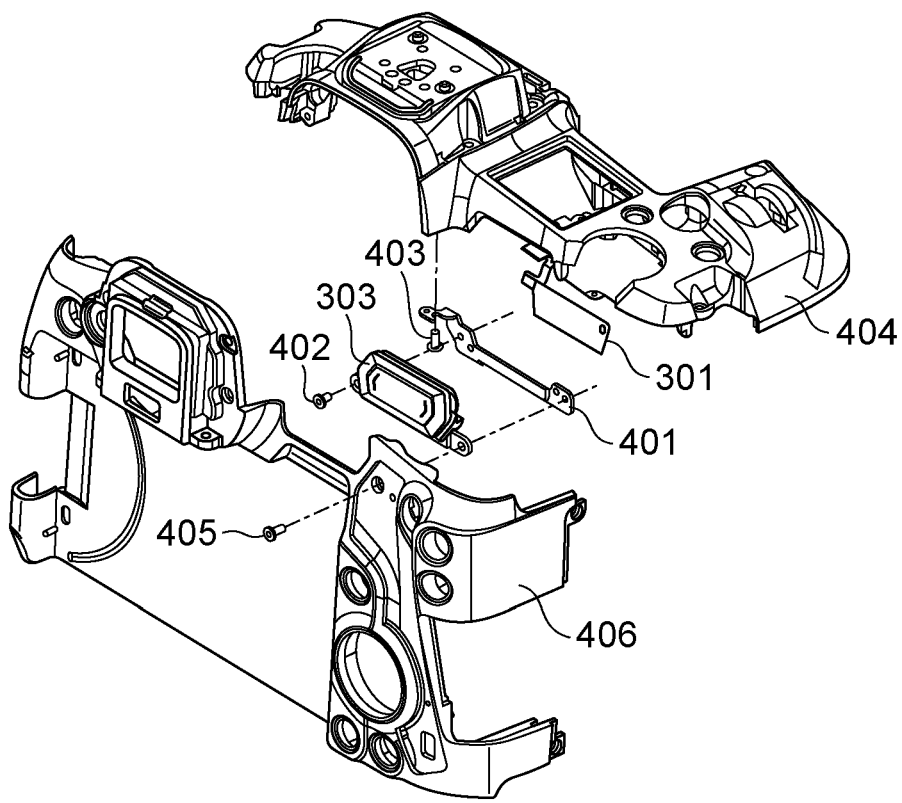
FIGS. 4A through 4C are views of the touch bar, where

Next, the detailed configuration of the touch bar 82 will be described. FIG. 4A is a disassembled view of the touch bar 82, the touch bar 82 being made up of the keytop 303 that is an external appearance part, and the flexible board 301 that has the touch sensor electrode 302 performing capacitive touch detection.

The touch sensor electrode 302 detects capacitance that changes when the thumb of the user touches the keytop 303, according to the capacitive touch detection method. Accordingly, the keytop 303 needs to be configured of a non-electroconductive material.

Also, there is need for change in capacitance to be great in order to improve response of touch detection, so the permittivity of the non-electroconductive member of the keytop 303 is preferably high. Accordingly, the material is a non-electroconductive resin material containing a glass filler with high permittivity.

As illustrated in FIG. 4A, the keytop 303 is fixed to a keytop fixing member 401 by screws 402, and the keytop fixing member 401 is fixed to an upper cover 404 of the digital camera 100 by screws 403 along with the keytop 303. The keytop 303 is also fixed to a rear cover 406 of the digital camera 100 by screws 405 along with the keytop fixing member 401.

Figure 4B:
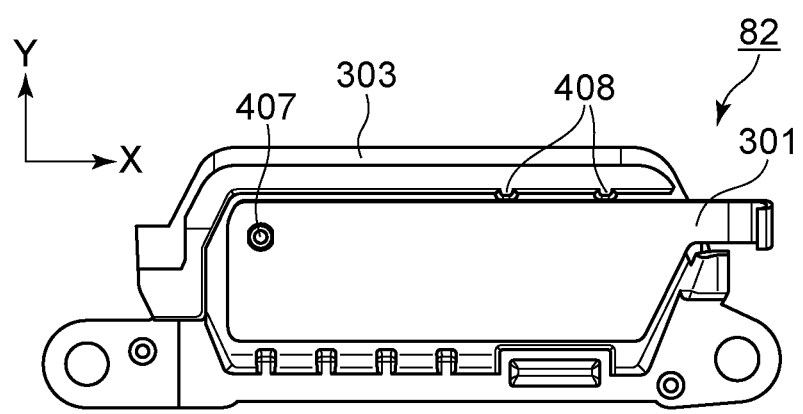

The upper cover 404 and rear cover 406 are formed of an electroconductive material, to improve electricity noise shielding capabilities of the digital camera 100. For example, the material is a magnesium alloy, electroconductive resin, or the like. The flexible board 301 is applied to the rear face of the keytop 303, as illustrated in FIG. 4B.

A boss 407 and ribs 408 are formed on the rear face of the keytop 303. The flexible board 301 is applied to the keytop 303 of the touch bar 82 by double-sided adhesive tape that is omitted from illustration, by the boss 407 being fit to the positioning hole 305 and the flexible board 301 being pressed against the ribs 408. The double-sided adhesive tape is preferably thin, around 50 μm to 100 μm, to prevent interfering with detection by the touch sensor. Accordingly, the flexible board 301 and touch sensor electrodes wired thereto can be attached to the keytop 303 serving as an operating face, in a restricted region with high precision near the touch sensor electrodes.

Figure 4C:
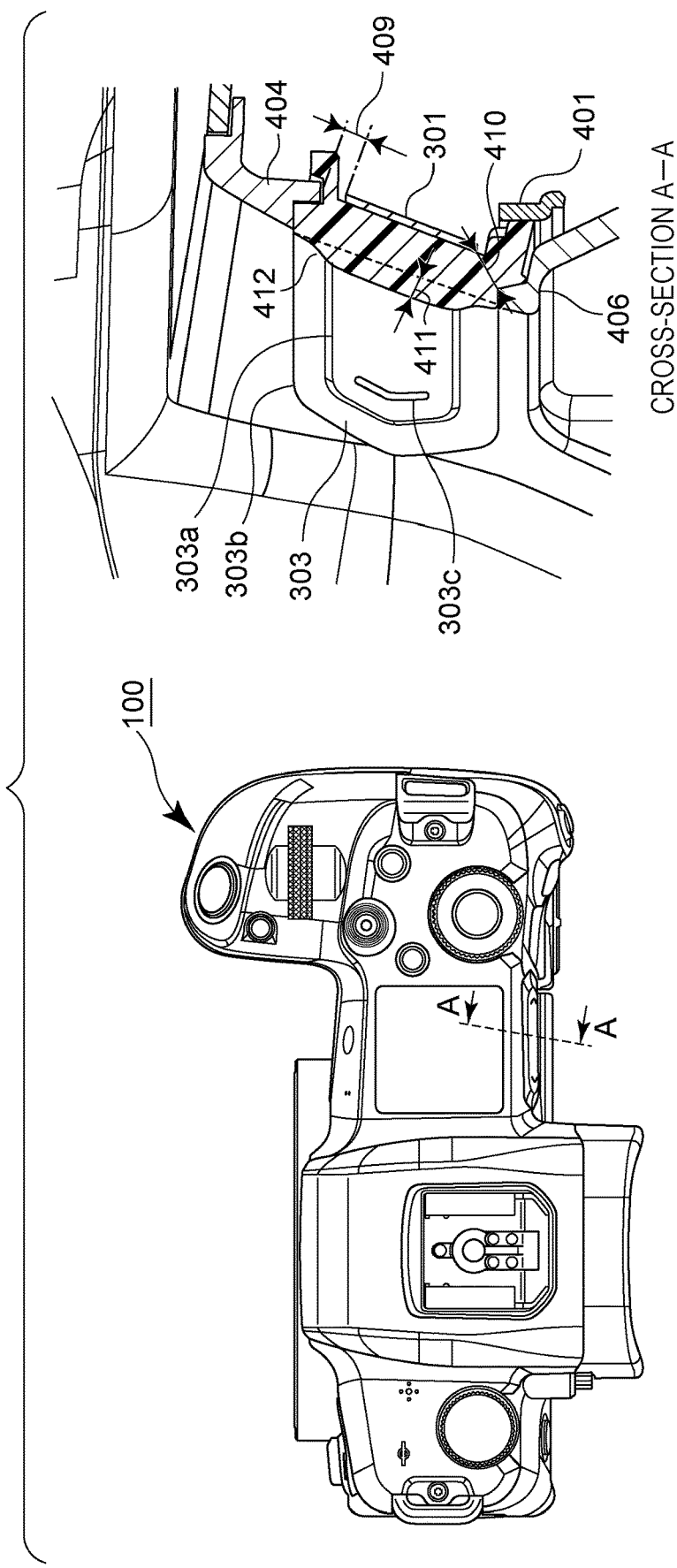

Next, FIG. 4C is a cross-sectional view of the touch bar 82. As described above, the keytop 303 has a touch detection region encompassed by the keytop outline 303a and a touch-non-detection region encompassed by the keytop outline 303a and keytop outline 303b.

The inner side of the keytop outline 303a is the first operating face, and the outer side of the keytop outline 303a that is on the inner side of the keytop outline 303b is the second operating face (see FIG. 3).

A face where the first operating face on the inner side of the keytop outline 303a and the touch sensor electrode 302 come overlap is the first touch detection region, and a face where the first operating face on the inner side of the keytop outline 303a and the touch sensor electrode 302 do not overlap is the first touch-non-detection region. The second operating face surrounds the outer perimeter of the first operating face (see FIG. 3).

A face where the second operating face and the touch sensor electrode 302 overlap is a second touch detection region, and a face where the second operating face and the touch sensor electrode 302 do not overlap is a second touch-non-detection region (see FIG. 3).

The first operating face that is a plane positioned on the rear face of the imaging apparatus protrudes further toward the rear than the second operating face surrounding the outer perimeter of the first operating face. That is to say, the first operating face has a face at a position higher on the rear side than the second operating face. This is because a certain distance needs to be provided between the upper cover 404 and rear cover 406 made of electroconductive material, and the touch sensor electrode 302, otherwise the capacitance for touch detection will be discharged to the electroconductive material, and output of touch detection will deteriorate.

FIG. 4C illustrates clearances 409 and 410 between the touch sensor electrode 302 and the upper cover 404 and rear cover 406. Output necessary for touch detection is obtained in the touch sensor electrode 302 according to the present example, by providing clearance of at least 1 mm or more.

It is from the above-described reason that the keytop 303 has the touch-non-detection region on the full perimeter thereof. However, in a case where the user performs touch operations of the touch bar 82 while looking at the EVF 29, the user is not able to distinguish between the touch detection region and the touch-non-detection region, since the operations will be blind operations. Accordingly, blind touch operations are enabled by the touch detection region of the keytop 303 being a raised shape 411 higher than the touch-non-detection region, and the touch-non-detection region being a recessed shape 412, as illustrated in FIG. 4C.

In the present example, the height of the raised shape 411 of the touch detection region (first operating face) is 1 mm higher as to the recessed shape 412. The user is prevented from easily making erroneous touch detection operations when grasping the thumb standby position 300, by the height of the raised shape 411 being higher in the Z direction as compared to the thumb standby position 300. Also, the user is prevented from easily making erroneous touch detection operations when looking in the EVF 29 of the eyepiece 16, by the height of the raised shape 411 of the touch detection region being lower than the face of the eyepiece 16 in the Z direction.

The keytop 303 is also arranged such that the surface of the touch detection region is smooth in texture as compared to the touch-non-detection region, and the surface of the touch-non-detection region is rough in texture, to facilitate distinguishing therebetween.

Further, the color of the surface of the touch detection region of the keytop 303 is made to be different from the touch-non-detection region, thereby increasing visibility of the touch detection region.

Description of Sub-Electronic Dial 73

The sub-electronic dial 73 is provided at a position recessed to the front side of the imaging apparatus (Z direction) in comparison with the touch face of the touch bar 82, as illustrated in FIGS. 1B and 4A. However, the step in the Z direction between the touch face of the touch bar 82 and the contact face of turning the sub-electronic dial 73 with the thumb of the right hand is small. Accordingly, there is the possibility of unintentionally touching the adjacent touch bar 82 when operating the sub-electronic dial 73.

In the present example in FIGS. 1B and 4A, the sub-electronic dial 73 is provided at a position recessed to the front side of the imaging apparatus (Z direction) in comparison with the touch face of the touch bar 82. However, an arrangement where the sub-electronic dial 73 is provided at a position protruding to the rear side of the imaging apparatus (Z direction) in comparison with the touch face of the touch bar 82 is also included in the present disclosure.

The step between the touch face of the touch bar 82 and the contact face of turning the sub-electronic dial 73 with the thumb of the right hand, protruding toward the rear side (Z direction) is small. Accordingly, there is the possibility of unintentionally touching the adjacent touch bar 82 with the thumb of the right hand when operating the sub-electronic dial 73.

The sub-electronic dial 73 is a rotational operating member that uniaxially rotates in the X direction with the Y direction as the axis of rotation.

When viewing the imaging apparatus (electronic equipment) from the rear side, the touch bar 82 serving as a first operating member overlaps the operating face of the display unit 28 serving as a display unit, in the sliding direction (X direction). The touch bar 82 serving as a first operating member does not overlap the operating face of the display unit 28 serving as a display unit, in a direction orthogonal to the sliding direction (Y direction).

When viewing the imaging apparatus (electronic equipment) from the rear side, the touch bar 82 is situated at a position recessed to the front side (Z direction) as to the operating face of the display unit 28. However, the step in the Z direction between the operating face (touch face) of the touch bar 82 and the operating face (touch face) of the display unit 28 is relatively great. Accordingly, when operating the display unit 28, the possibility of the thumb unintentionally touching the adjacent touch bar 82 is low.

In the present example, the step in the Z direction between the touch face of the touch bar 82 and the touch face of the display unit 28 is greater than the step in the Z direction between the touch face of the touch bar 82 and the contact face for turning the sub-electronic dial 73.

A line segment A is defined extending in the sliding direction, and passing through midpoints of the short sides of the touch detecting face of the touch sensor electrode 302 serving as a detecting arrangement (FIG. 3). In this case, a region of the N'th touch sensor electrode 302$n$ that is closer to the sub-electronic dial 73 with the line segment A (center line) as a reference is a first region. With the region of the N'th touch sensor electrode 302$n$ on the side closer to the display unit (touch panel) 28 as a second region, the surface area of the first region is narrower than the surface area of the second region.

Description of Linearity

In the touch sensor electrode 302 according to the present example illustrated in FIG. 3B, dogleg shaped gradient shapes are formed from the touch sensor electrode 302$b$ to adjacent touch sensor electrodes 302$a$ and 302$c$. Accordingly, when performing slide operations, the input values of capacitance of touch sensor electrodes can be gradually transitioned to adjacent electrodes, so operations with linearity secured can be performed. The apices of the dogleg shaped gradient shapes are situated at the general middle of the touch sensor electrode 302 in the Y direction, in the touch sensor electrode 302 according to the present example illustrated in FIG. 3B, and the angles $\theta 1$ and $\theta 2$ of the apices are set to be generally 90 degrees.

Figure 5A:
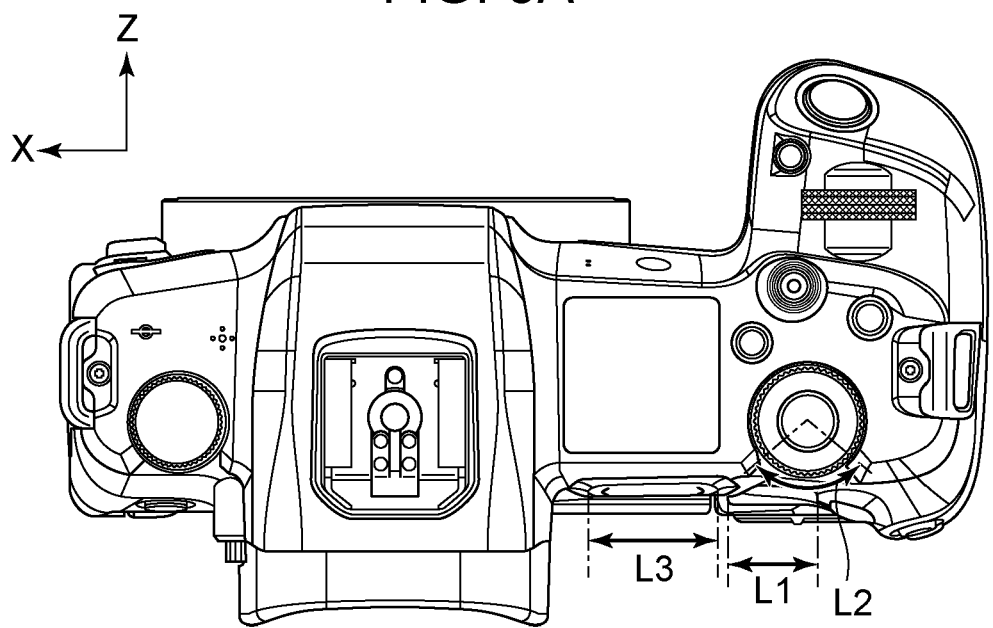
FIGS. 5A and 5B are views of the digital camera according to the first embodiment, where

Next, the relation in size between the keytop 303, the adjacent sub-electronic dial 73, and the thumb standby position 300 will be described with reference to FIGS. 5A and 5B. The relation in width in the X direction as illustrated in FIG. 5A is $L1 < L2, L2 \leq L3$ where L1 represents the X-directional width of the thumb standby position 300, L2 represents the X-directional width of the sub-electronic dial 73, and L3 represents the X-directional width of the touch detection region of the keytop 303. 5 mm or more is necessary for the X-directional width L1 of the thumb standby position 300 for example, since the average width of the thumb of a Japanese person is approximately 20 mm, and a fourth thereof will be used as contact area for holding the thumb standby position 300.

In a case of operating the sub-electronic dial 73 or touch bar 82, the amount of change width of setting values in one slide operation will be small unless there is a sliding distance of twice or more the contact area of the thumb. In such a case, slide operations will need to be performed repeatedly. Accordingly, at least the X-directional width L2 of the sub-electronic dial 73 and the X-directional width L3 of the touch detection region of the keytop 303 need to be 10 mm or more.

The touch bar 82 is given sliding operability equal to those of the sub-electronic dial 73. Accordingly, the X-directional width L3 of the touch detection region of the keytop 303 needs to be the same length as the X-directional width L2 of the sub-electronic dial 73 or longer.

Figure 5B:
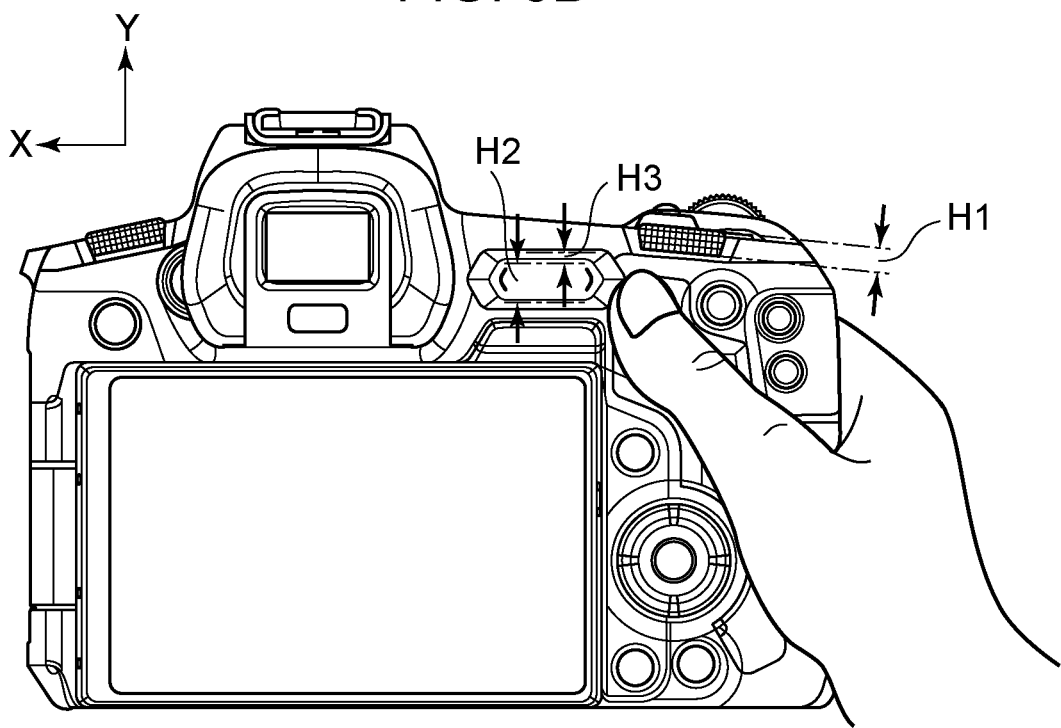

Also, the relation in width in the Y direction in FIG. 5B is $H1 \leq H2, H1 > H3$ where H1 represents the Y-directional width of the sub-electronic dial 73, H2 represents the Y-directional width of the touch detection region of the keytop 303, and H3 represents the Y-directional width of the touch-non-detection region.

As described above, the touch bar 82 is given sliding operability equal to those of the sub-electronic dial 73. Accordingly, the Y-directional width H2 of the touch detection region of the keytop 303 needs to be at least the same length as the Y-directional width H1 of the sub-electronic dial 73 or wider. The Y-directional width H3 of the touch-non-detection region of the keytop 303 needs to be smaller than the Y-directional width H1 of the sub-electronic dial 73 at the least, to prevent erroneous recognition as the detection region.

Figure 6A:
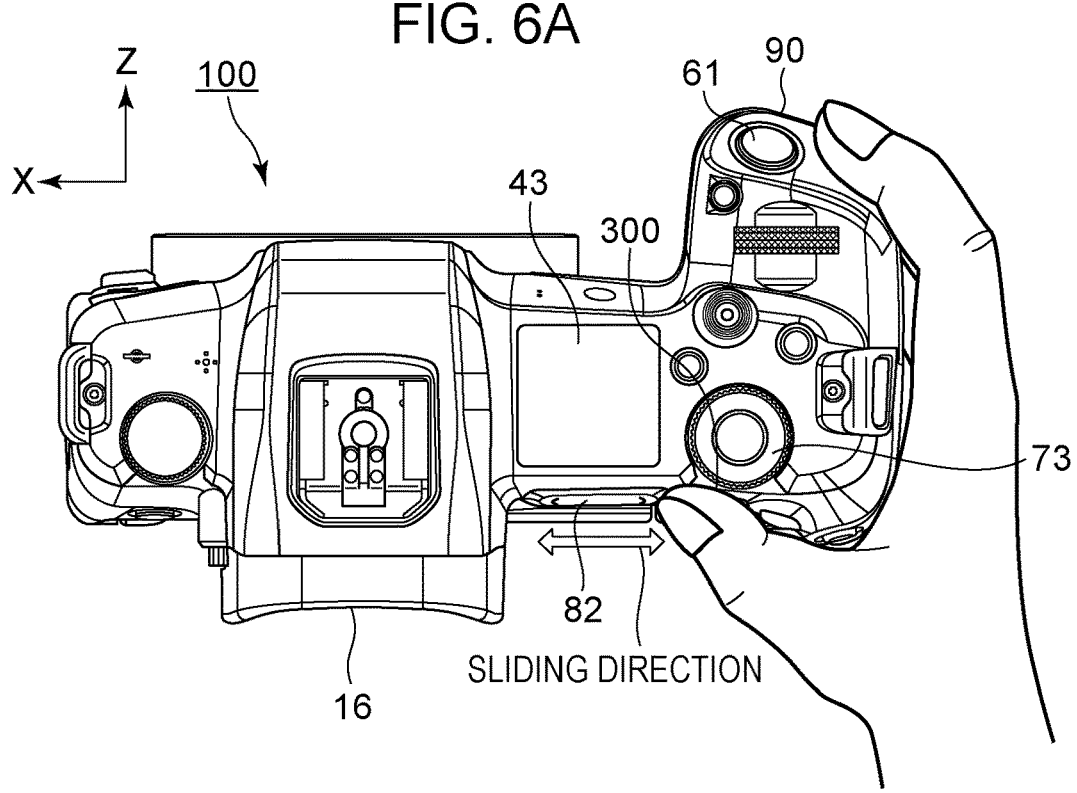
FIGS. 6A and 6B are views of the digital camera according to the first embodiment, where
Figure 6B:
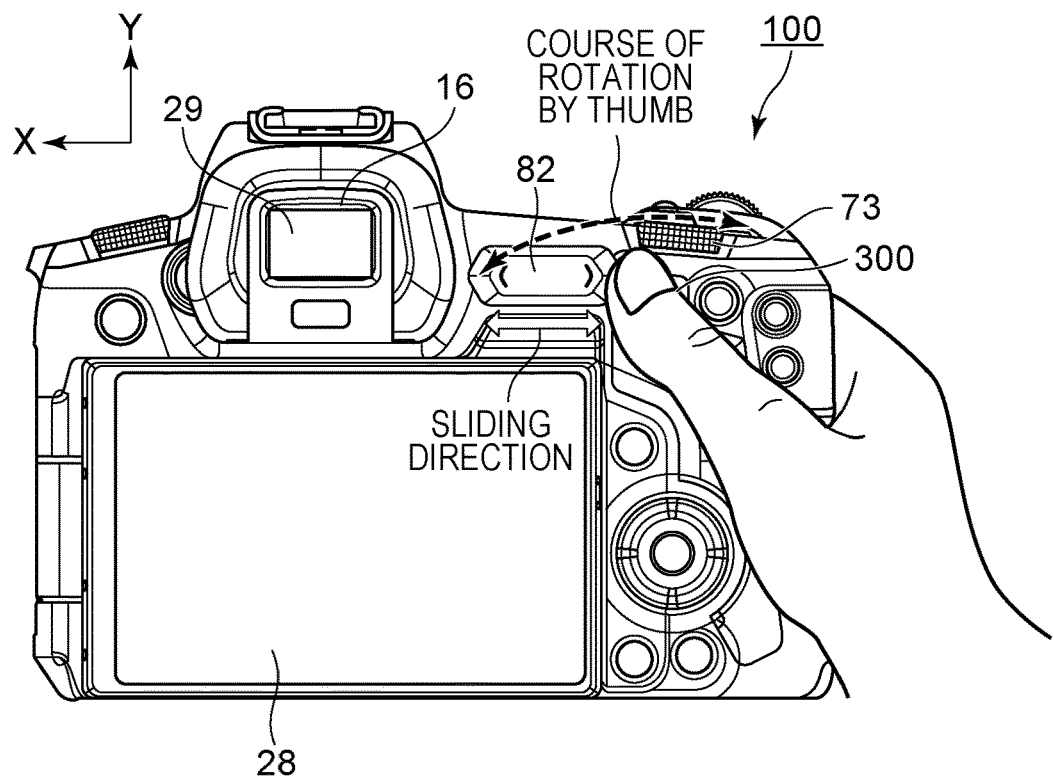

FIG. 6A is a diagram illustrating the digital camera 100 being held by a user, as viewed from above, and FIG. 6B is a rear view. The thumb standby position 300 generally exists at a position where the grip portion 90 is projected on the rear side as illustrated in FIG. 6A, and often the position is indicated by application of rubber or the like, which also increases grip. The positional relation between the touch bar 82 and the sub-electronic dial 73 is such that the course of rotation by the thumb is centered on the thumb standby position 300, so that the touch bar 82 and sub-electronic dial 73 can be operated while gripping the grip portion 90, as illustrated in FIG. 6B.

The rotational direction of the sub-electronic dial 73 and the slide operation direction of the touch bar 82 are matched in the X direction in FIG. 6B in accordance with the course of rotation by the thumb, with the operability of the touch bar 82 and the sub-electronic dial 73 being the same. The touch bar 82 is adjacent to the thumb standby position 300. Accordingly, the layout is such that tap operations and slide operations to the left and right (in the sliding direction illustrated in FIG. 3) and so forth is easily performed by the thumb of the right hand in a state of gripping the grip portion 90, as described above.

The touch bar 82 can assign functions in accordance with operations. For example, functions of changing settable exposure-related setting values can be assigned using the main electronic dial 71 and sub-electronic dial 73 that are operating members. Exposure-related setting values are shutter speed (Tv), aperture value (Av), ISO sensitivity, and exposure correction values when in automatic exposure mode.

For example, a case of having assigned functions of ISO sensitivity settings to the touch bar 82 will be described. In a case of a tap operation being performed at a position to the left half of the touch bar 82, in a case where function operations are performed to set the shooting ISO sensitivity of the digital camera 100 to sensitivity ⅓ step lower, functions of setting the shooting ISO sensitivity to sensitivity ⅓ step lower are assigned. In a case where a tap operation is performed at positional coordinates to the right half side, functions of setting the shooting ISO sensitivity to sensitivity ⅓ step higher are assigned. In a case where slide operations are performed, functions of setting the shooting ISO sensitivity of the digital camera 100 to sensitivity ⅓ step higher or lower are assigned for each step of sliding.

These assignable functions are customizable by the user, and for example, changes can be made such as, in a case where a tap operation is made at a left half position, functions for automatically setting shooting ISO sensitivity of the digital camera 100 are assigned. Changes can be made such as, in a case where a tap operation is made at a right half positional coordinate, functions for setting the shooting ISO sensitivity to the highest ISO sensitivity are assigned.

The touch bar 82 can also assign, besides exposure-related setting values, settings such as white balance settings, AF mode, drive mode, and playback feed.

When in the moving image mode, microphone recoding level adjustment, or moving image playback fast-forward or reverse functions can be assigned.

As described above, various functions can be operated by the touch bar 82, but there is a need to perform operations while viewing the display screen provided to the digital camera 100 in order to perform operations while comprehending the various functions set to the touch bar 82.

Figure 7A:
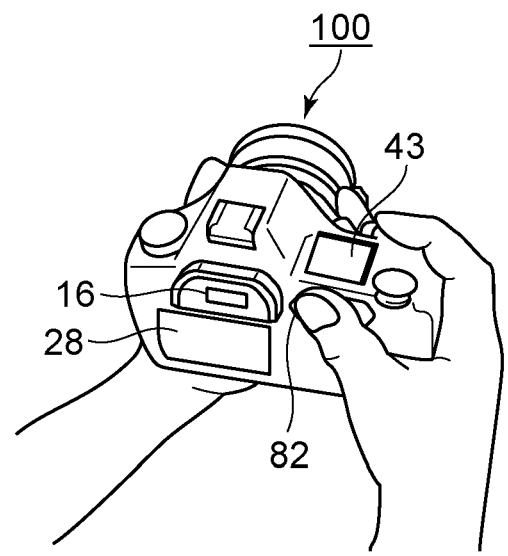
FIGS. 7A and 7B are schematic diagrams of a user operating the touch bar.
Figure 7B:
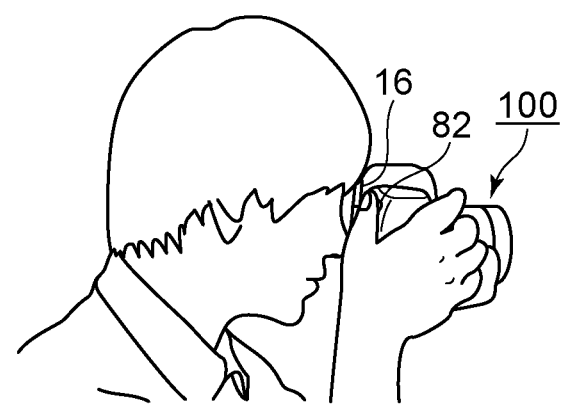

FIG. 7A is a schematic diagram illustrating a user operating the touch bar 82 while looking at the display unit 28 provided on the rear face of the camera and a non-viewfinder display unit 43 provided on the upper face of the camera. FIG. 7B is a schematic diagram illustrating a user operating the touch bar 82 while looking at the EVF 29 within the direct viewfinder. In a case of a camera having multiple display units as illustrated in FIGS. 7A and 7B, the user performs shooting and setting of shooting functions in various styles, so the touch bar 82 needs to be situated at a position that is easy to operate while looking at any of the display units.

Figure 8B:
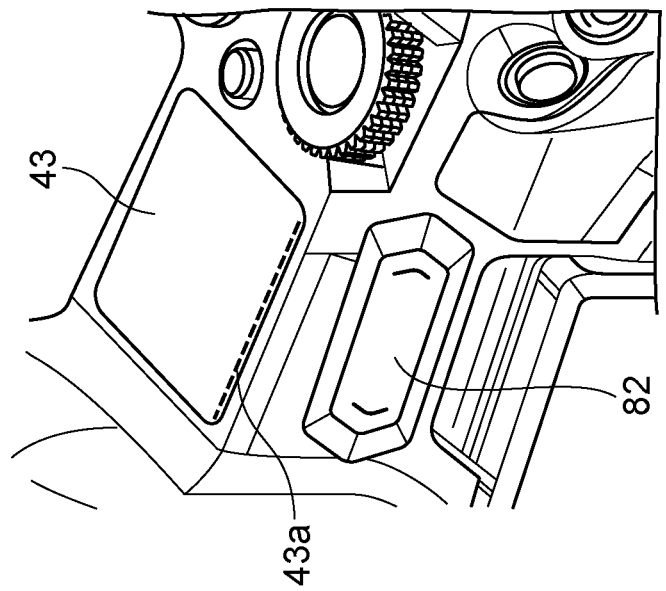
FIGS. 8A and 8B are schematic diagrams illustrating the positional relation between the touch bar and a display unit.
Figure 8A:
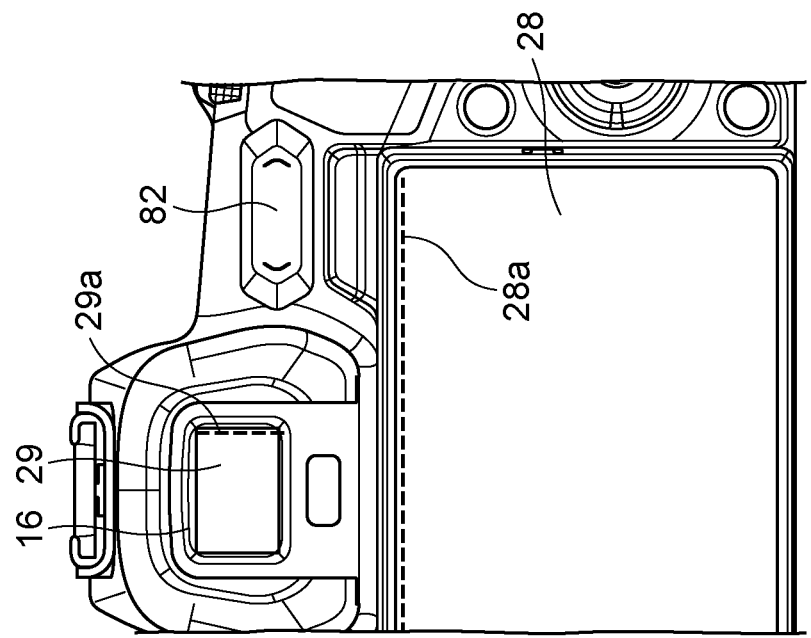

FIGS. 8A and 8B are schematic diagrams illustrating the positional relation between multiple display units and the touch bar 82, which is a feature of the present disclosure. FIG. 8A illustrates the positional relation between the touch bar 82 and the display unit 28 provided to the rear face of the camera and the EVF 29 provided within the direct viewfinder, and FIG. 8B illustrates the positional relation between the touch bar 82 and the non-viewfinder display unit 43 provided to the upper face of the camera. The touch bar 82 is disposed adjacent to an upper edge 28a of the display unit 28 and a right edge 29a of the EVF 29, as illustrated in FIG. 8A. The touch bar 82 is also disposed adjacent to a lower edge 43a of the non-viewfinder display unit 43, as illustrated in FIG. 8B. Positioning the touch bar 82 so as to be surrounded by the display units enables the touch bar 82 to be operated with comprehension of the display screens and touch operations, while viewing any of the display units as illustrated in FIGS. 7A and 7B.

Particularly, camera users such as professional photographers and advanced amateurs often quickly perform shooting settings while looking at the EVF 29 or non-viewfinder display unit 43. Accordingly, the user can perform an action of looking at a display unit in a positional relation with the touch bar 82 that is a feature of the present disclosure, and touch operations, as a single sequence of actions.

Figure 9B:
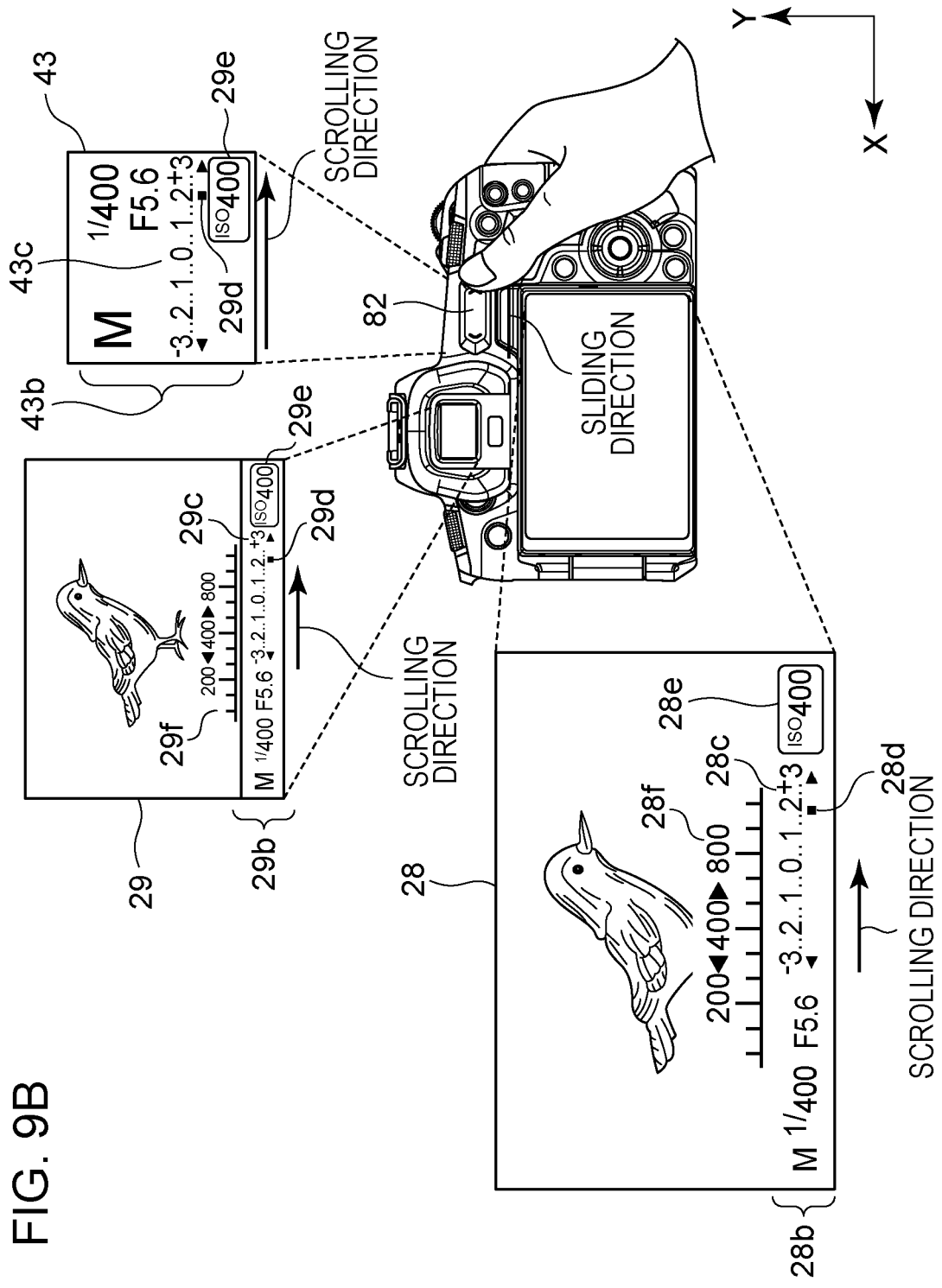

Next, FIGS. 9A and 9B are schematic diagrams illustrating the relation between the display screens of the display units and the sliding direction of the touch bar 82. FIG. 9A illustrates the display screens where exposure-related shooting setting values are displayed. Shooting setting values are arrayed in the X direction on a display screen lower portion 28b of the display unit 28 provided on the rear face of the camera.

Generally, shot images are long in the X direction (landscape), with the ratio of long sides to short sides (aspect ratio) being 3:2 or 4:3. Accordingly, the display unit 28 and EVF 29 for playback display or LV display of taken images is long in the X direction, to match the aspect ratio of the shot image.

The display unit 28 has the setting values displayed arrayed in the X direction at the display screen lower portion 28b, so that the display is not superimposed on the subject image during LV display, and to display all shooting setting values in one row, as illustrated in FIG. 9A. Particularly, an exposure meter 28c that displays photometric values in manual exposure mode and correction values in automatic exposure mode has a long display width, and accordingly is not well-suited for display arrayed in the Y direction. An exposure meter cursor 28d that displays photometric values and correction values of the exposure meter 28c is scrolled over the meter in the X direction when setting values are changed. In the present disclosure, switching display of setting values by cursor moment or sliding of setting values is defined as scrolling, and the direction thereof is defined as scrolling direction.

Setting values of which settings can be changed are selected by a settings value selection cursor 28e, and settings selected by the cursor can be changed using the main electronic dial 71, sub-electronic dial 73, and touch bar 82, which are operating members.

The display screen of the EVF 29 has the setting values including an exposure meter 29c and exposure meter cursor 29d, and a settings value selection cursor 29e, displayed arrayed in the X direction at a display screen lower portion 29b, in the same way as the display unit 28.

The non-viewfinder display unit 43 only displays setting values and does not display shot images, so the setting values and a settings value selection cursor 43e are not displayed horizontally. Note however, that an exposure meter 43c and exposure meter cursor 43d of the non-viewfinder display unit 43 are displayed in the X direction for the display direction, in accordance with the exposure meters of the display unit 28 and EVF 29. Accordingly, in a case of changing exposure correction values when in automatic exposure mode by slide operations of the touch bar 82, the exposure meter cursors of the exposure meters on the display units are scrolled in the X direction.

Also, in a case of changing the shutter speed (Tv), aperture value (Av), or ISO sensitivity, using the touch bar 82 when in manual exposure mode, the exposure meter cursors of the exposure meters on the display units are scrolled in the X direction. Accordingly, the user can perform movement of the exposure meter cursor correlated with the slide operation direction of the touch bar 82, since the slide operation direction of the touch bar 82 and the scrolling direction of the exposure meter cursor are the same.

FIG. 9B is a schematic diagram illustrating a case of changing ISO sensitivity using the touch bar 82. The settings value selection cursors (28e, 29e, 43e) of the display units are illustrated in a state where the ISO sensitivity item has been selected, and settings can be changed at the touch bar 82.

When the user brings the thumb into contact with the touch bar 82 and starts a slide operation, ISO sensitivity meters 28f and 29f are displayed on the display unit 28 and EVF 29, respectively. As the user slides the thumb over the touch bar 82 to the right side in the X direction, the display of the ISO sensitivity meters 28f and 29f are scrolled to the right side in the X direction, and the ISO sensitivity is changed from ISO 100 to ISO 400. The exposure value is raised by two steps in accordance with the change in ISO sensitivity, so the exposure meter cursors (28d, 29d, 43d) of the exposure meters on the display units are scrolled to the right side in the X direction. The meters of the setting values are scrolled in the X direction in which the they are displayed, in the same way when changing the shutter speed (Tv) and aperture value (Av) using the touch bar 82.

As described above, the scrolling direction of exposure meter cursors and meter displays for the setting values on the display units is the same as the slide operation direction of the touch bar 82. Accordingly, the user can intuitively perform various changes to settings using the touch bar 82, while viewing the display units. Although the scrolling direction of the touch bar 82 is the X direction in the present example, the direction is not restricted to the X direction, since it is sufficient for the scrolling direction of the touch bar 82 to be the same as the scrolling direction of the meter displays of the setting values displayed on the display units.

Also, the positional relation between the EVF 29 and touch bar 82 has been described in the present example. However, this is not restrictive, and can be implemented using a transmissive liquid crystal display unit overlaid on a focusing screen of an optical viewfinder having a mirror, pentagonal prism, and focusing screen. Accordingly, implementation is not restricted to a direct viewfinder having the EVF 29.

Also, although description has been made where the size of a touch sensor electrode is the planar surface area, for example, ease of input may be adjusted by three-dimensional shapes, such as curved shapes, uneven shapes, and so forth.

Second Embodiment

A second embodiment that uses an optical tracking pointer (OTP, an optical input device) 700 at the position of the touch bar 82 will be described next with reference to FIGS. 13A through 16. A first operating member (OTP) 700 having a touch detecting face, configured to detect touch operations and slide operations on a touch operating face, is provided in the present embodiment.

Also provided are eyepieces 16 and 29 serving as a first display unit provided on the rear face of the imaging apparatus serving as a first face where the touch operating face is disposed. Also provided is the display unit 28 serving as a second display unit, configured with a larger display area than the first display units 16 and 29, and disposed in a direction orthogonal to a horizontal direction (sliding direction) with regard to the touch operating face. The display area of the eyepiece 16 is small in comparison with the display area of the display unit 28, so a space is left open in the horizontal direction between the eyepiece 16 and the grip portion 90 having a thumb standby position 300 (hereinafter also referred to as "grip portion 90 and 300"), in which the first operating member (OTP) 700 is provided for improved/refined operability by the user between the first display units 16 and 29 and the grip portion 90 and thumb standby position 300 in the horizontal direction, the grip portion 90 and thumb standby position 300 having been provided as a grip portion for the user to grip.

The second display unit (touch panel) 28 is provided on a first face where the touch operating face is disposed. The second display unit 28 is disposed so at least two scrolling directions of setting items displayed on the second display unit 28 that can be operated by the first operating member 700, and the direction of slide operation of a touch operating face 124, match.

The second display unit (upper face panel) 43 is provided on an upper face that differs from the first face where the touch operating face 124 is disposed. The second display unit (upper face panel) 43 is disposed so at least two scrolling directions of setting items displayed on the second display unit 43 that can be operated by the first operating member (OTP) 700, and the direction of slide operation of the touch operating face 124, match.

A second rotational operating member (electronic dial) 71 that rotates in a different direction from that of a first rotational operating member (electronic dial) 73 is provided. The rotational direction of the first rotational operating member 73 matches one slide operation direction of the at least two slide operation directions of the touch operating face. The second rotational operating member 71 is disposed with the rotational direction of the second rotational operating member 71 matching the other slide operation direction of the at least two slide operation directions of the touch operating face.

The directions in which a display object that is displayed on the second display unit (touch panel) 28 and that can be operated by the first operating member (OTP) 700 can move is at least eight directions, and the display unit (touch panel) 28 is disposed so that the slide operation directions of the touch operating face 124 match these at least eight directions. The directions in which a display object that is displayed on the eyepieces 16 and 29 and that can be operated by the first operating member (OTP) 700 can move is at least eight directions, and the eyepiece is disposed so that the slide operation directions of the touch operating face 124 match these at least eight directions.

Description of Functions of OTP 700

The optical tracking pointer (hereinafter, "OTP") 700 detects touch operations and detects relative motion of an object (e.g., a thumb) in two-dimensional directions by optically detecting movement of patterns such as thumbprints or the like of the thumb. The OTP 700 is a touch operating member that can output movement information relating to movement of a thumb or the like. The OTP 700 has a light emitting unit and an optical position detecting element (both omitted from illustration).

The light emitting unit that is omitted from illustration emits light from within toward a thumb placed on the surface of the OTP cover 124 (see FIG. 16) disposed on the OTP 700. The OTP cover 124 is formed of resin or the like that transmits the light, and the thumb is irradiated by the emitted light. The reflected light from the patterns such as thumbprints or the like of the thumb is focused at the position detecting element, and the position of the thumb is detected. The optical position detecting element can be realized by an image sensor or the like, for example.

As one example in the present embodiment, image processing described in Japanese Patent Laid-Open No. 11-345076 and so forth may be used to perform image tracking of the direction of movement and amount of movement of the thumb, and generate signals indicating movement of the thumb.

Figure 15:
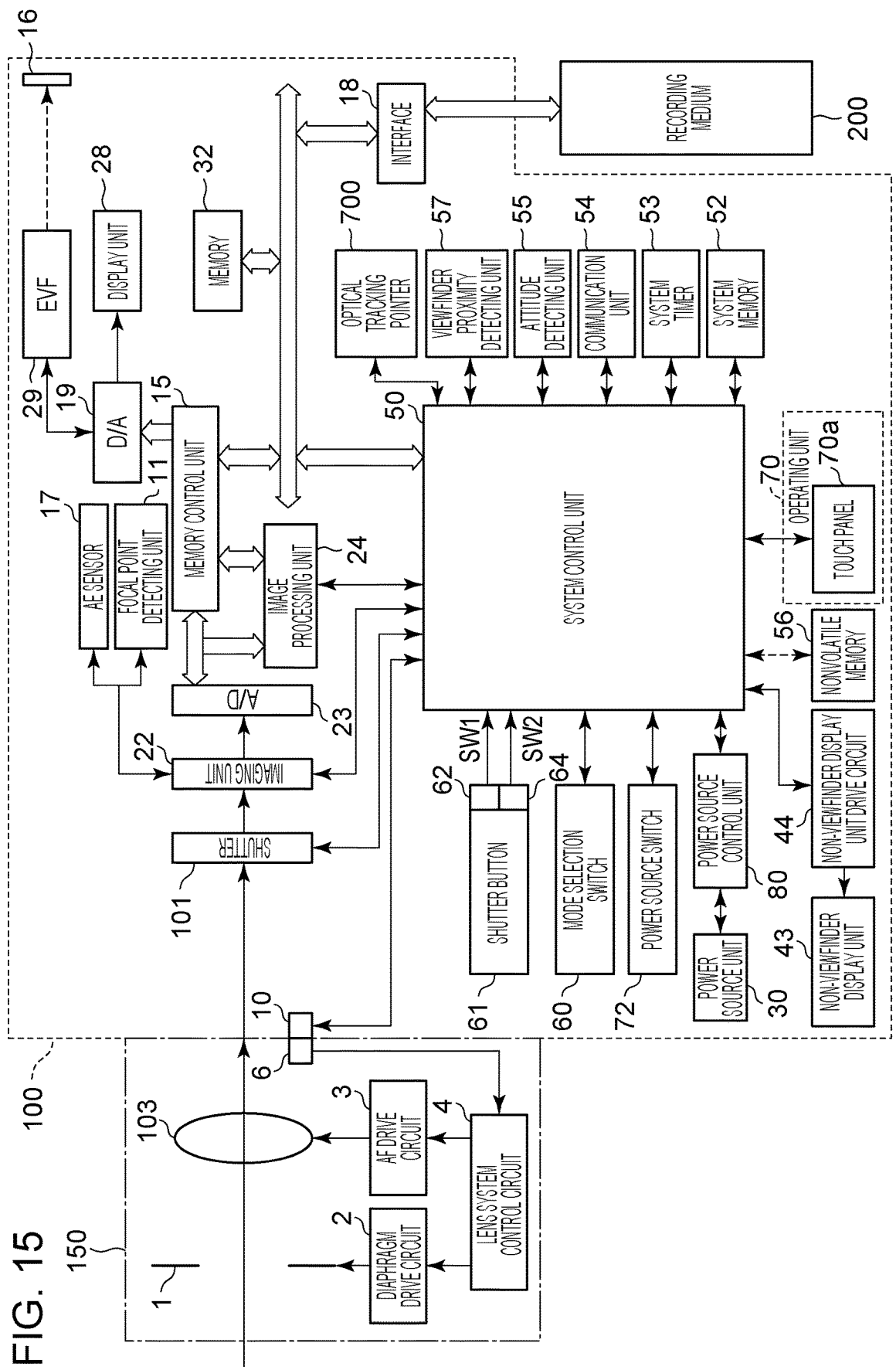
FIG. 15 is a schematic block diagram illustrating a hardware configuration example of the digital camera according to the second embodiment.

The OTP 700 is connected to the system control unit 50, as illustrated in FIG. 15. The system control unit 50 obtains direction of movement of slide operations from the eight directions of up, down, left, right, upper left, lower left, upper right, and lower right (hereinafter referred to as "movement direction"), based on output from the OTP 700. The system control unit 50 further obtains the amount of motion of slide operations as two-dimensional direction of X-axis direction and y-axis direction (hereinafter referred to as "movement amount (x, y)") based on output from the OTP 700.

The system control unit 50 can detect the following operations and states regarding the OTP 700.

A thumb that has not been in touch with the OTP 700 has newly touched the OTP 700, i.e., a touch has been started (referred to as touch-down).

A thumb is in a state touching the OTP 700 (referred to as touch-on).

A thumb is moving while being in a state touching the OTP 700 (referred to as touch-move).

A thumb that had been in a state touching the OTP 700 has moved away, i.e., end of touch (referred to as touch-up).

A state where nothing is touching the OTP 700 (referred to as touch-off).

When touch-down is detected, touch-on is also detected at the same time. Unless touch-up is detected after touchdown, touch-on normally continues to be detected. Touchmove is detected in a state where touch-on is detected. Even if touch-on is detected, touch-move is not detected as long as the movement amount (x, y) is zero. Touch-off is after touch-up of all fingers/thumb in touch has been detected.

The system control unit 50 determines what sort of operation (touch operation) has been made on the OTP 700, based on the above-described operations, states, movement directions, and movement amounts (x, y). For touch-move, movement in the eight directions of up, down, left, right, upper left, lower left, upper right, and lower right, or movement in the two-dimensional direction of X-axis direction and y-axis direction, on the OTP 700 is detected. Upon detecting movement in one or both of the eight directions and two-dimensional direction of X-axis direction and y-axis direction, the system control unit 50 determines that a slide operation has been made.

In a case where the OTP 700 is touched by a thumb, and the touch is released within a predetermined amount of time without performing a slide operation, the system control unit 50 determines that a tap operation has been performed.

The OTP 700 is an infrared-type touch sensor in the illustrated example. However, the OTP 700 may be a different type of touch sensor, such as resistive, surface acoustic wave, capacitive, electromagnetic induction, image recognition, optical sensor, and so forth.

Figure 13A:
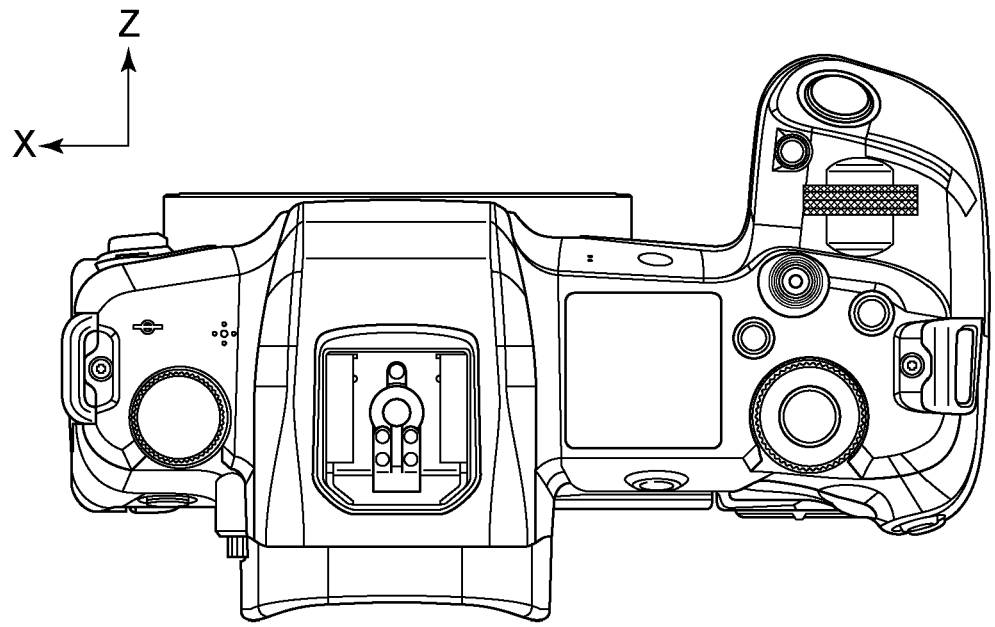
FIGS. 13A and 13B are views of a digital camera according to a second embodiment, where
Figure 13B:
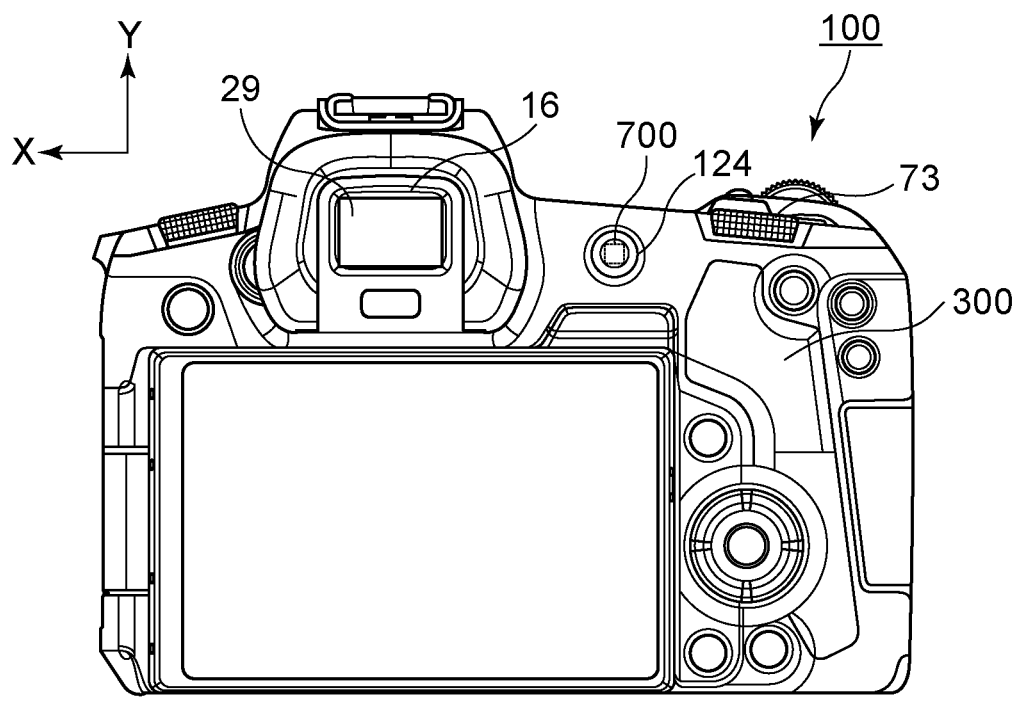
Figure 14:
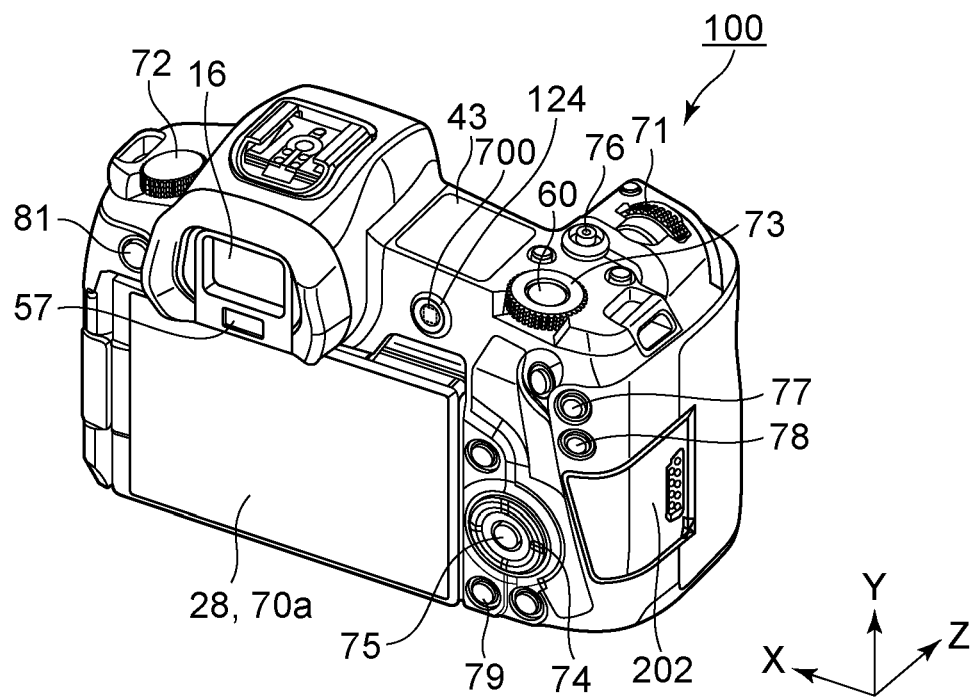
FIG. 14 is a perspective view of the digital camera according to the second embodiment.

The OTP 700 is placed adjacent to the eyepiece 16 on the rear side of the digital camera 100, in the same way as the placement of the touch bar 82, as illustrated in FIGS. 13A through 14. The OTP 700 is also disposed adjacent to the sub-electronic dial 73 and the thumb standby position 300 when holding the camera by gripping the grip portion 90 with the right hand.

The imaging apparatus (electronic equipment) has the first display units 16 and 29 provided on the face at the rear side where the OTP 700 is provided. The imaging apparatus (electronic equipment) has the second display units 28 and 43. The display area of the second display units 28 and 43 is larger than the display area of the first display units 16 and 29.

The second display unit 28 is provided on the face at the rear side where the OTP 700 is disposed. The second display unit 28 is disposed so scrolling directions of setting items displayed on the second display unit 28 that can be operated by the OTP 700, and the direction of slide operation of the OTP 700, match.

The second display unit 43 is provided on an upper face of the digital camera 100 that differs from the face at the rear side where the OTP 700 is disposed.

The display area of the second display unit (touch panel) 28 is the largest of the display areas, followed by the display area of the second display unit (upper face panel) 43 and the first display units (eyepiece) 16 and 29, in that order.

The second display unit 43 is disposed so scrolling directions of setting items displayed on the second display unit 43 that can be operated by the OTP 700, and the direction of slide operation of the OTP 700, match.

The second display unit 28 is a touch panel. When viewed from the rear side of the electronic equipment, the second display unit 28 is disposed so the direction of slide operation of the touch panel face of the second display unit 28 and the direction of slide operation of the OTP 700 match.

When viewed from the rear side of the electronic equipment, the first rotational operating member (sub-electronic dial) 73 is provided at a position so that the rotation direction of the first rotational operating member 73 and the slide operation direction of the OTP 700 match. When viewed from the rear side of the electronic equipment, the OTP 700 is disposed on the course of the thumb of the user rotationally operating the first rotational operating member 73.

The first display units 16 and 29 are the eyepiece 16 that is disposed adjacent to the OTP 700 in the direction of slide operations, and that protrudes toward the rear side as to the OTP 700. When viewed from the rear side of the electronic equipment, the eyepiece 16 is disposed so scrolling directions of setting items displayed on the eyepiece 16 that can be operated by the OTP 700, and the direction of slide operation of the OTP 700, match.

The height of the OTP 700 in the direction toward the rear side is higher than the height of the grip portion 90 and thumb standby position 300 in the direction toward the rear side, and is lower than the height of the eyepiece 16 in the direction toward the rear side.

The material of the detecting face of the OTP 700 is a resin that transmits the light by which the thumb is irradiated, described above.

The sub-electronic dial (second operating member) 73 is provided disposed adjacent to the operating face of the OTP 700 in the direction of slide operations.

When viewed from the rear side of the electronic equipment, the OTP 700 is disposed at a position recessed toward the front side (Z direction) with regard to the operating face of the display unit 28.

The positional relation between the OTP 700 and the sub-electronic dial 73 is such that the course of rotation by the thumb is centered on the thumb standby position 300, so that the OTP 700 and sub-electronic dial 73 can be operated while gripping the grip portion 90.

The rotational direction of the sub-electronic dial 73 and the slide operation direction of the OTP 700 are matched in the X direction in FIG. 13 in accordance with the course of rotation by the thumb, with the operability of the OTP 700 and the sub-electronic dial 73 being the same. The OTP 700 is adjacent to the thumb standby position 300.

The OTP 700 is disposed adjacent to an upper edge 28a of the display unit 28 and a right edge 29a of the EVF 29. The OTP 700 is also disposed adjacent to a lower edge 43a of the non-viewfinder display unit 43. Positioning the OTP 700 so as to be surrounded by the display units enables the OTP 700 to be operated with comprehension of the display screens and touch operations, while viewing any of the display units. The layout is such that tap operations and slide operations to the left and right, and up and down, or the like, is easily performed by the thumb of the right hand in a state of gripping the grip portion 90, as described above.

The OTP 700 can assign functions in accordance with operations. For example, functions of changing settable exposure-related setting values using the main electronic dial 71 and sub-electronic dial 73 that are operating members can be assigned. Also, individual assigning may be performed, such as the main electronic dial 71 that is an operating member being assigned X-direction scrolling of settable setting values related to exposure, and the sub-electronic dial 73 being assigned Y-direction scrolling of settable setting values related to exposure. Exposure-related setting values are shutter speed (Tv), aperture value (Av), ISO sensitivity, and exposure correction values when in automatic exposure mode. In a case of changing shutter speed (Tv), aperture value (Av), ISO sensitivity, or exposure correction values when in automatic exposure mode, meters for the setting values are displayed and scrolled in the X direction.

The OTP 700 is configured to execute performing operations not only in the X direction, but in the Y direction, and in all directions of two-dimensional coordinates combining X and Y. For example, operations may be performed where setting items such as the above-described shutter speed (Tv), aperture value (Av), ISO sensitivity, or exposure correction values when in automatic exposure mode, are switched by scrolling in the Y direction, and actual setting values are changed by scrolling in the X direction.

Scrolling relates to moving display of text and diagrams on a display screen vertically or horizontally, as if reading a scroll. It also relates to moving the middle of a window vertically or horizontally, a little at a time, in order to view contents that do not fit in the window and are not displayed, so as to display hidden portions.

Using movement information of a thumb moving in a relative manner, that is the output of the OTP 700, enables the positions of cursors, pointers, arrows, or the like, such as a ranging frame that is omitted from illustration, displayed on the first display units 16 and 29 and display unit 28, to be moved. For example, the system control unit 50 acquires the movement amount (x, y) of the thumb detected by the OTP 700. Thereafter, the system control unit 50 stores this movement amount (x, y) in the system memory 52. Further, the system control unit 50 acquires the direction of movement that has been detected by the OTP 700. Thereafter, the system control unit 50 stores this direction of movement in the system memory 52. The system control unit 50 finds the post-movement position of the ranging frame, based on the movement amount (x, y) and the direction of movement stored in the system memory 52. The system control unit 50 then displays the post-movement position thereof on the first display units 16 and 29 and display unit 28.

Structure of OTP 700

Figure 16:
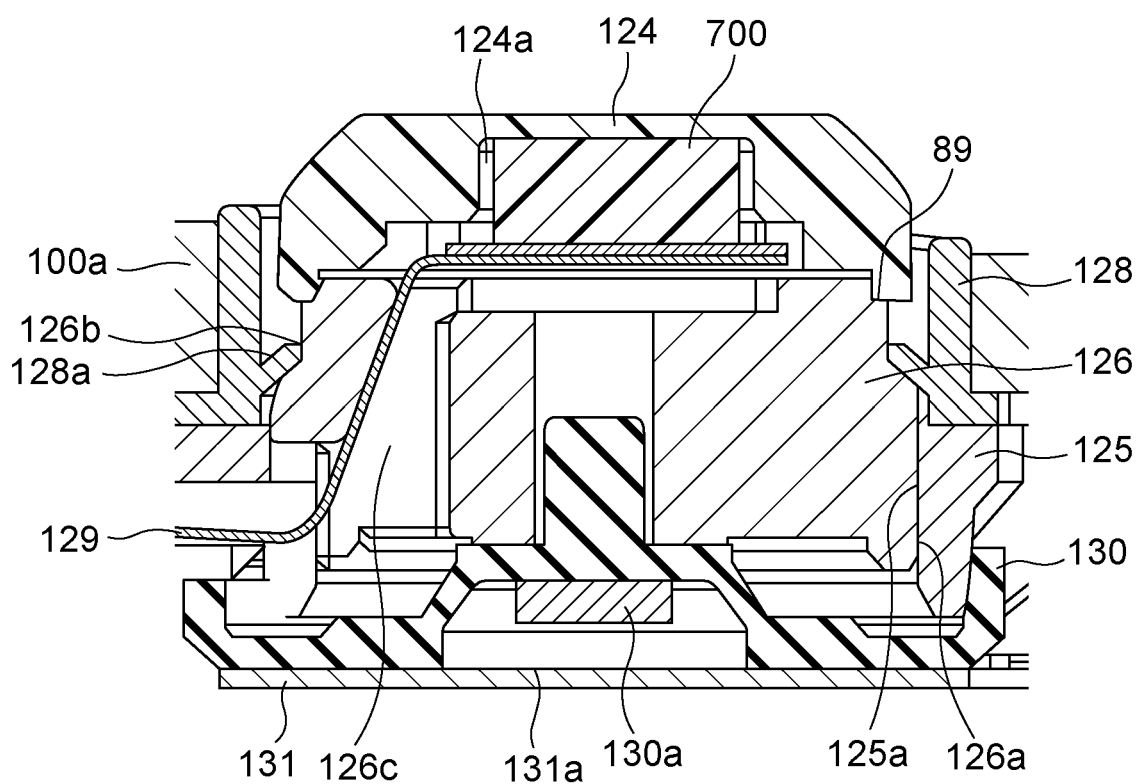
FIG. 16 is a cross-sectional view for describing detailed structures of an optical input device provided to the digital camera according to the second embodiment.

FIG. 16 is a cross-sectional view for describing the OTP 700 provided to the digital camera 100. First, the configuration of the OTP 700 assembled into the OTP cover 124 will be described.

The OTP cover 124 is movable in a direction generally perpendicular as to the digital camera 100. That is to say, the OTP cover 124 turns on by being pressed. Note that the OTP cover 124 is a switch that uses electroconductive rubber (first electroconductive portion), for example. The OTP 700 is disposed on a recess 124a formed in the OTP cover 124.

A button base 125 having a shaft hole 125a through which this button moves by sliding, and an under keytop 126 having a fitting shaft 126a that fits into the shaft hole 125a, are provided directly beneath the OTP cover 124. The OTP 700 is then joined to the OTP cover 124 by adhesion of the full perimeter of a bonding portion 127 of the OTP cover 124 and under keytop 126, so as to integrally move. That is to say, the OTP 700 is disposed below (beneath) the face of the OTP cover 124, which is one operating member, where the thumb is placed.

An elastic member 128 of silicon rubber or the like is interposed between an external cover (exterior member) 100a of the digital camera 100 and the button base 125. Accordingly, invasion of water from between the external cover 100a and the button base 125 can be prevented. Further, an inclined portion 126b formed on the under keytop 126 and an arm portion 128a provided to the elastic member 128 are in contact over the full perimeter. This enables invasion of water from between the OTP cover 124 and external cover 100a to be prevented.

The OTP 700 is mounted on a flexible board 129. The flexible board 129 is connected to a board (omitted from illustration) through a hole 126c formed in the under keytop 126 via the inner perimeter of the arm portion 128a.

A switch rubber 130 having electroconductive rubber (first electroconductive portion) 130a, and a flexible printed board 131, are disposed below the under keytop 126. An electroconductive pattern (second electroconductive member) 131a is positioned beneath the electroconductive rubber 130a on the flexible printed board 131.

Pressing the OTP cover 124 down presses the electroconductive rubber 130*a* into contact with the electroconductive pattern 131*a* by being pressed by the under keytop 126 adhered to the OTP cover 124. Thus, the OTP cover 124 is in an on state (electrically connected).

Although a switch using electroconductive rubber is used as the OTP cover 124 in the above-described embodiment, it is sufficient for an on operation to be performed by operating in a generally perpendicular direction to the digital camera 100, and a tact switch using a reversal spring or the like may be used, for example.

Although embodiments of the present disclosure have been described, the present embodiment is not restricted to these embodiments, and various modifications and alterations may be made within the scope of the essence thereof.

The electronic equipment according to the present disclosure is not restricted to a digital camera that is an imaging apparatus, and may be applied to photocopiers, laser beam printers (LBP), and ink jet printers as well. The touch bar according to the present disclosure may be used for a touch operating face where numbers of copies, size of copy paper sheets, and so forth, are changed by touch operations/slide operations, while holding a monitor.

The present disclosure is also applicable to mobile devices such as smartphones, tablet computers, smart watches, and other like portable small-sized computers. The touch bar according to the present disclosure may be disposed outside of the screen of the mobile device and can be used for touch operations/slide operations for image feeding, selecting, and so forth.

Further, the present disclosure is also applicable to automotive, medical equipment, and gaming usages. The touch bar according to the present disclosure may be disposed on the steering wheel of an automobile, so as to enable menu switching by touch operations, or fine adjustment of audio level, zooming in/out an automotive navigation screen, and so forth by slide operations, while steering the automobile. In medical equipment usages, the touch bar according to the present embodiment may be disposed on a grip of a handy X-ray device, to enable fine adjustment by slide operations.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-125514, filed Jun. 29, 2018, which is hereby incorporated by reference herein in its entirety.

What is claimed is:

1. Electronic equipment comprising:
   a first operating member having a touch detecting face and configured to detect a touch operation on a touch operating face and to detect a slide operation slid in a direction on the touch operating face;
   a first display unit provided on a first face where the touch operating face is disposed;
   a second display unit configured with a second display area that is larger than a first display area of the first display unit, and disposed in a direction orthogonal to the direction of slide operation with regard to the touch operating face; and
   a grip portion configured for a user to grip,
   wherein the touch detecting face is divided into at least two touch detecting faces of a first touch detecting face through an N'th touch detecting face, in order from the first display unit side in the direction of slide operation,
   wherein the first display unit is closest to the first touch detecting face out of the at least two touch detecting faces in the direction of slide operation,
   wherein the grip portion is closest to the N'th touch detecting face out of the at least two touch detecting faces in the direction of slide operation,
   wherein the second display unit is closest to the touch detecting face in a direction orthogonal to the direction of slide operation,
   wherein the first operating member is recessed from the second display unit in a direction orthogonal to the first face,
   wherein the first operating member is recessed from the first display unit in a direction orthogonal to the first face,
   wherein the grip portion is recessed from the first operating member in a direction orthogonal to the first face,
   wherein the touch operating face is a switch for operating an input surface by the slide operation with a thumb of a user who grips the grip portion, and
   wherein a length of the direction of slide operation of the first operating member is longer than a length of the direction of slide operation of the grip portion located on the first face of the electronic equipment.

2. The electronic equipment according to claim 1,
   wherein the second display unit is provided on the first face where the touch operating face is disposed, and
   wherein the second display unit is disposed so that a scrolling direction of setting items displayed on the second display unit that can be operated by the first operating member, and the direction of slide operation on the touch operating face, match.

3. The electronic equipment according to claim 1,
   wherein the second display unit is provided on a face that differs from the first face where the touch operating face is disposed, and
   wherein the second display unit is disposed so that a scrolling direction of setting items displayed on the second display unit that can be operated by the first operating member, and the direction of slide operation on the touch operating face, match.

4. The electronic equipment according to claim 3, wherein the second display unit is a touch panel.

5. The electronic equipment according to claim 1, wherein a first rotational operating member is provided at a position adjacent to the touch detecting face in a horizontal direction, and the first rotational operating member is disposed so that a rotational direction of the first rotational operating member and the direction of slide operation of the touch operating face, match.

6. The electronic equipment according to claim 5, further comprising a second rotational operating member configured to rotate in a direction different from the rotational direction of the first rotational operating member,
wherein the rotational direction of the first rotational operating member matches one direction of slide operation of at least two slide operation directions of the touch operating face, and the second rotational operating member is disposed with the rotational direction of the second rotational operating member matching another direction of slide operation of the at least two slide operation directions of the touch operating face.

7. The electronic equipment according to claim 1, wherein the first operating member is disposed on a course of a thumb of the user rotationally operating a first rotational operating member.

8. The electronic equipment according to claim 1,
wherein the first display unit is an eyepiece protruding in a direction orthogonal to the direction of slide operation as to the touch operating face of the first operating member, and
wherein the eyepiece is disposed so that a scrolling direction of setting items displayed in the eyepiece that can be operated by the first operating member, and the direction of slide operation of the touch operating face, match.

9. The electronic equipment according to claim 1,
wherein the touch operating face, the first display unit, and the second display unit are disposed on the same face, and
wherein the first display unit and the second display unit are disposed at positions protruding beyond the touch operating face in a direction orthogonal to the direction of slide operation.

10. The electronic equipment according to claim 1,
wherein the second display unit is provided on the first face where the touch operating face is disposed, and
wherein the second display unit is disposed so that at least two scrolling directions of setting items displayed on the second display unit that can be operated by the first operating member, and the direction of slide operation of the touch operating face, match.

11. The electronic equipment according to claim 1,
wherein the second display unit is provided on a face that differs from the first face where the touch operating face is disposed, and
wherein the second display unit is disposed so that at least two scrolling directions of setting items displayed on the second display unit that can be operated by the first operating member, and the direction of slide operation of the touch operating face, match.

12. The electronic equipment according to claim 11,
wherein the second display unit is a touch panel, and
wherein the touch panel is disposed so that directions of slide operation in at least two directions on a touch panel face of the touch panel, and directions of slide operation on the touch operating face, match.

13. The electronic equipment according to claim 1,
wherein the first display unit is an eyepiece protruding in a direction orthogonal to the direction of slide operation as to the touch operating face of the first operating member, and
wherein the eyepiece is disposed so that at least two scrolling directions of setting items displayed on the eyepiece that can be operated by the first operating member, and the direction of slide operation of the touch operating face, match.

14. The electronic equipment according to claim 1,
wherein the second display unit is provided on the first face where the touch operating face is disposed, and
wherein directions in which a display object that is displayed on the second display unit and that can be operated by the first operating member can move is at least eight directions, and the second display unit is disposed so that directions of slide operation of the touch operating face match these at least eight directions.

15. The electronic equipment according to claim 14, wherein the second display unit is a touch panel.

16. The electronic equipment according to claim 1,
wherein the first display unit is an eyepiece protruding in a direction orthogonal to the direction of slide operation as to the touch operating face of the first operating member, and
wherein directions in which a display object that is displayed on the eyepiece and that can be operated by the first operating member can move is at least eight directions, and the eyepiece is disposed so that directions of slide operation of the touch operating face match these at least eight directions.

17. The electronic equipment according to claim 1,
wherein the first operating member is disposed between the first display unit and the grip portion in the direction of slide operation,
wherein the touch detecting face is divided into at least two touch detecting faces of a first touch detecting face through an N'th touch detecting face, in order from the first display unit side in the direction of slide operation,
wherein the first display unit is closest to the first touch detecting face out of the at least two touch detecting faces in the direction of slide operation, and
wherein the grip portion is closest to the N'th touch detecting face out of the at least two touch detecting faces in the direction of slide operation.

18. The electronic equipment according to claim 1, wherein a first rotational operating member is provided at a position adjacent to the touch detecting face in a horizontal direction, and the length of the direction of slide operation of the first operating member is longer than the rotational operation width of rotational operations of the first rotational operating member.

19. The electronic equipment according to claim 1,
wherein the first operating member has a first operating face that overlaps the touch detecting face, and a second operating face that is disposed on an outer periphery of the first operating face and that does not overlap the touch detecting face, and
wherein the first operating face protrudes farther in a direction orthogonal to the first face as compared to the second operating face.

* * * * *